United States Patent [19]
Berling

[11] Patent Number: 5,833,440
[45] Date of Patent: Nov. 10, 1998

[54] LINEAR MOTOR ARRANGEMENT FOR A RECIPROCATING PUMP SYSTEM

[76] Inventor: James T. Berling, 5434 E. Galbraith Rd., Cincinnati, Ohio 45236

[21] Appl. No.: 387,403

[22] Filed: Feb. 10, 1995

[51] Int. Cl.$^6$ .................................................. F04B 17/04
[52] U.S. Cl. .............................................. 417/418; 310/23
[58] Field of Search .................................. 417/417, 418; 310/15, 17, 23, 24, 29, 30

[56] References Cited

U.S. PATENT DOCUMENTS

| 3,461,806 | 8/1969 | Barthalon | 417/418 |
| 3,894,817 | 7/1975 | Majoros et al. | 417/417 |

FOREIGN PATENT DOCUMENTS

| 609073 | 8/1926 | France | 417/418 |
| 56-88971 | 7/1981 | Japan | 417/417 |
| 1121491 | 10/1984 | U.S.S.R. | 417/417 |

OTHER PUBLICATIONS

"The Ideal Magnet—Fully controllable Permanent Magnets for Power and Transport", G.R. Polgreen, *Electronics & Power*, Jan., 1971, pp. 31–34.
"Introduction to Magnetic Materials", B.D. Cullity, Addison–Wesley Publishing Co., 1972, pp. 608–646.
"Testing and Measurement of Permanent Magnets", Magnetic Materials Producers Association, 1717 Howard Street, Evanston, Illinois 60202, 1975, pp. 24–25.

*Primary Examiner*—John J. Vrablik
*Assistant Examiner*—Roland G. McAndrews, Jr.
*Attorney, Agent, or Firm*—Frost & Jacobs

[57] ABSTRACT

A magnetically-powered linear displacement device is disclosed which can be used as the highly efficient pollution-free prime mover. The linear displacement device utilizes a permanent magnet whose flux density can be readily shifted from one of two parallel magnetic paths within the displacement device. A pair of pole pieces made of magnetically soft material abuts portions of the permanent magnet and conducts the magnetic flux in two different magnetic circuit pathways such that the permanent magnet's flux can flow in either direction, and if the magnetic flux is travelling along a first of these parallel paths through a movable armature, that armature will be attracted toward the ends of the pole pieces. If the magnetic flux is then shifted to the second path of these two parallel paths, then that movable armature will not be attracted to the pole pieces, and a compression spring can be used to push that movable armature away from the pole pieces. The magnetic pathways are shifted by use of electromagnetic coils wrapped around certain portions of the pole pieces, such that when a current pulse of a given polarity is directed into these coils, the resultant reluctance of the pole pieces is either increased or decreased to shift the path of the magnetic flux from one of the parallel pathways to the other. When the polarity of the current pulse is reversed, the movable armature is forced to the opposite position of its linear displacement travel. By energizing the electromagnetic coils sequentially with alternating opposite polarities, the movable armatures will move in a reciprocating fashion. The displacement device can be configured to act as a linear alternator by the addition of one or more magnetos that create electrical current as the movable armature moves through its normal travel. The displacement device further can be configured to operate as a pump or a valve by adding a fluid chamber with appropriate fluid ports.

7 Claims, 21 Drawing Sheets

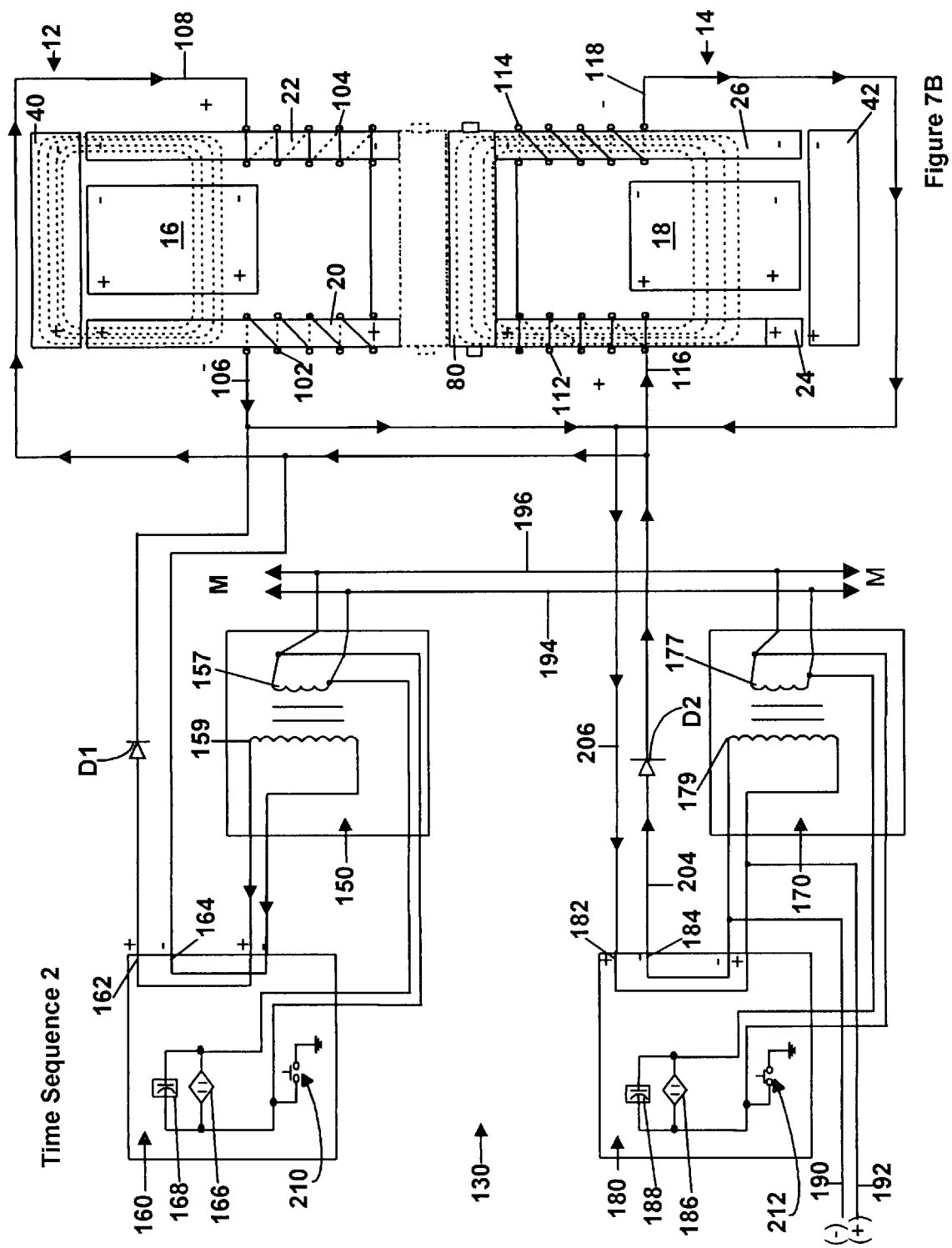

LINEAR MOTOR ARRANGEMENT FOR A RECIPROCATING PUMP SYSTEM

TECHNICAL FIELD

The present invention relates generally to prime mover equipment and is particularly directed to a magnetically-powered linear displacement device of the type which uses a permanent magnet. The invention is specifically disclosed as a magnetic linear displacement device that uses parallel magnetic circuits to attract a soft magnetic piston first in one direction, and then in a second opposite direction to generate a reciprocating motion.

BACKGROUND OF THE INVENTION

Magnetic devices are quite old in the art, especially for use in electromagnets and other similar devices that attract structures made of iron and steel. In a technical journal article by G. R. Polgreen titled, "The Ideal Magnet—Fully Controllable Permanent Magnets for Power and Transport," Electronics and Power (J. Inst. Elec. Engrs.) 17. 31–34 (1971), a magnetic device was disclosed that included both a permanent magnet and an electromagnetic circuit, in which the permanent magnet was used as a safety back-up to lift scrap metal. While picking up and retaining scrap metal, the flux originating in the permanent magnet would flow through the scrap metal, thereby attracting the scrap metal to the device. To release the scrap metal from the device, the electromagnetic circuit would be energized to divert the magnetic circuit from the scrap metal to a second, parallel magnetic circuit path. When this occurred, the scrap metal would fall from the device.

The Polgreen device was a mere holding device, and provided no useful motion in and of itself. A magnetic device that produces mechanical motion by use of a permanent magnet having two parallel magnetic circuit paths that are shiftable in alternate cycles has the potential of being very efficient in power produced vs. power consumed.

SUMMARY OF THE INVENTION

Accordingly, it is a primary object of the present invention to provide a magnetically-powered linear displacement device that produces reciprocating linear motion and uses a permanent magnet to provide a very high efficiency in work produced versus energy consumed.

It is another object of the present invention to provide a magnetically-powered linear displacement device that uses compression springs to increase its operating efficiency to an even higher level.

It is a further object of the present invention to provide a magnetically-powered linear displacement device that incorporates magnetos to automatically provide electrical current pulses into the linear displacement device at the proper times, thereby making the linear displacement device self-sufficient.

It is yet another object of the present invention to provide a plurality of magnetically-powered linear displacement devices that are connected mechanically in a manner so as to increase the displacement capacity or the force produced, or both, by connecting the devices in parallel or in series, or in a radial configuration.

It is yet a further object of the present invention to provide a magnetically-powered displacement piston-driven pump in which the magnetic piston's reciprocating motions are translated to a hydraulic piston that imparts a flow and pressure to a fluid medium within the pump's chamber, and uses a permanent magnet to provide a very high efficiency in work produced versus energy consumed.

Yet another object of the present invention is to provide a magnetically-powered valve that uses a magnetic piston or a magnetic spool that is movable between two positions, thereby opening and/or closing certain ports of the valve, and which uses a permanent magnet to provide a very high efficiency in work produced versus energy consumed at times when the valve is to move from one position to the other.

A further object of the present invention is to provide a magnetically-powered motor vehicle that incorporates several magnetically-powered linear displacement pumps and magnetically-powered valves to produce a fluid medium under high pressure that is used to turn the wheels of the motor vehicle.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved magnetically-powered displacement device (i.e., a linear prime mover or linear motor) is provided having two half-assemblies that each contain a strong permanent magnet. Each half-assembly also includes pole pieces made of a soft magnetic material that surround the sides of each of the permanent magnets at their north and south poles. In addition, each of the half-assemblies includes an armature made of soft magnetic material that provides a magnetic circuit path at the two ends of the linear displacement device. A movable piston made of soft magnetic material is located near the center of the linear displacement device, and is movably attached to the ends of the two permanent magnets by a pair of compression springs. Each of the pole pieces has an electrical coil wound around them, the coil in each of the half-assemblies having the capability of either increasing or decreasing the resultant reluctance of the pole pieces at a point near the movable piston. When the coils are energized in a first polarity in the first half-assembly, the resultant reluctance of the pole pieces is decreased, so that the flux produced by the pole pieces of the permanent magnet of that half-assembly travels through the movable piston rather than through the armature, thereby attracting the piston toward the pole pieces of the permanent magnet in that first half-assembly. At the same moment, the current that runs through the coil of the second half-assembly increases the resultant reluctance of the pole pieces near the piston, thereby directing the magnetic flux of the permanent magnet in the second half-assembly through the armature, rather than through the movable piston. When these events occur, the movable piston is attracted toward the pole pieces of the permanent magnet of the first half-assembly, and the compression spring of that first half-assembly is compressed. During this time, the compression spring of the second half-assembly uncompresses, and tends to push the movable piston away from the pole pieces of the permanent magnet of the second half-assembly.

When the polarity of the current is reversed, the coil of the first half-assembly tends to increase the resultant reluctance of the pole pieces near the piston in the first half-assembly, thereby diverting the magnetic flux produced by the permanent magnet from the movable piston toward and through the armature of the first half assembly. At the same moment, the current through the coil in the second half-assembly decreases the resultant reluctance of the pole pieces near the piston in the second half-assembly, thereby diverting the magnetic flux produced by the permanent magnet in the second half-assembly from its armature toward and through the movable piston. These magnetic circuit flux path changes attract the movable piston toward the permanent magnet of the second half-assembly, thereby compressing its spring, and uncompressing the spring of the first half-assembly, at which time that spring tends to push the movable piston away from the first half-assembly and toward the second half-assembly. In each stroke of the displacement device, there is a displacement chamber developed, thereby providing two displacement chambers per cycle.

In a second embodiment, a small permanent magnet is placed on the outer edges of the movable piston, such that the lines of magnetic flux that emanate from the magnet pass by a series of electrically conductive coils of wire that are attached to the stationary housing of the displacement devise. With special attention to the orientation of the coils of wire and the direction of magnetic flux, this device constitutes a magneto. Each time the piston moves from one position to the next, the small magnet induces an electrical pulse into the coils of wire. The magneto, therefore, produces a current that is temporarily stored in a capacitor and then released at the proper moment, so as to energize the coils that are attached to the displacement device with the proper polarity to change the reluctance of the magnetic circuits such that the movable piston is attracted toward the pole faces of the permanent magnet that it is presently furthest from. As the piston moves, the magneto cuts magnetic lines of force in the opposite direction, and thereby charges the capacitor in the opposite polarity, which at the proper time then produces a current in the opposite direction through the coils to change the reluctances of the magnetic circuits so that the movable piston will now travel in the opposite direction. In this manner, the reciprocating motion of the linear displacement device becomes self-sustaining.

In a third embodiment, the end armatures are both movable, each having its own compression spring to increase efficiency, and are preferably mechanically tied together by tie-rods or tubes. In this configuration, the force produced by the displacement device is essentially doubled per permanent magnet used as compared to the first and second embodiments described above and creates motion at the ends of the assembly, rather than in the middle. In addition, by use of the tie-rods or tubes, several of these assemblies can be mechanically connected by a common set of tie-rods or tubes running throughout several identical displacement devices, thereby increasing the overall mechanical force by a multiplying factor that is equal to the number of devices used in a single, ganged assembly. There are two displacement chambers developed per stroke, and four overall displacement chambers developed per cycle. One or more magnetos can be readily installed around the periphery of one or more of the movable armatures, thereby making the operation of the third embodiment self-sustaining. In addition, more than one permanent magnet and additional parallel pole pieces can be added between the armatures to increase the overall magnetic strength of the assembly.

An improved magnetically-powered linear displacement pump is provided having a strong permanent magnet with pole pieces made of a soft magnetic material which abut the sides of the permanent magnet at its north and south poles. The pump includes two armatures (or one armature and a piston) made of soft magnetic material that provide magnetic circuit paths at each of the two ends of the pole pieces. At least one of the armatures (or the piston) is movable with respect to the permanent magnet, and is attached to the end of the permanent magnet by a compression spring. The pole pieces have an electromagnetic coil wound around them at locations near the movable armature or piston, and the coil has the capability of either increasing or decreasing the resultant reluctance of the pole pieces at a point near the movable armature or piston. When the coils are energized in a first polarity, the resultant reluctance of the pole pieces near the coils is decreased, so that the flux produced by the permanent magnet and flowing through the pole pieces travels through the movable armature or piston, rather than through the armature at the opposite end of the permanent magnet, thereby attracting the movable armature or piston toward the pole pieces.

When the polarity of the current is reversed, the electromagnetic coils tend to increase the resultant reluctance of the pole pieces near the movable armature or piston, thereby diverting the magnetic flux produced by the permanent magnet away from the magnetic circuit that includes the movable armature or piston, and this flux will then flow through the alternate magnetic circuit that includes the armature at the opposite end of the permanent magnet. When this occurs, the movable armature or piston is no longer attracted toward the pole pieces, and the compression spring pushes that movable armature or piston away from the pole pieces.

The magnetic movable armature or piston is mechanically attached to at least one hydraulic piston that reciprocates within a pumping chamber so that a fluid within that chamber is periodically compressed or pressurized by the hydraulic piston. The fluid can be either a liquid or a gaseous substance, which is introduced into the pumping chamber at a suction port, and then is output from that chamber through a discharge port. To increase the flow and pressure capacities of the magnetically-powered pump, there would normally be two hydraulic pistons and pump chambers per magnetic movable armature or piston, one hydraulic piston on each side of the magnetic movable armature or piston. In addition, the overall pump assembly would normally either include two permanent magnets to alternately pull the magnetic piston toward one or the other of these permanent magnets, or there would be a single permanent magnet having both end armatures movable which would both be connected by tie-rods so that the pole pieces at one or the other end of the permanent magnet are alternately attracting one or the other of the movable armatures toward the pole pieces.

An improved magnetically-powered valve is provided having a strong permanent magnet which has pole pieces made of a soft magnetic material abutting the sides of the permanent magnet at its north and south poles. Two end armatures are provided made of soft magnetic material, and at least one of these armatures is movable (i.e., just like a piston) so that it can either open a fluid passageway, or block such fluid passageway between an inlet port and an outlet port. The movements of the magnetic movable armature or piston are controlled by electromagnetic coils that are positioned around the pole pieces near the movable armature or piston, so that when the coils are energized with a current pulse having a particular polarity, the resultant reluctance of the pole pieces is decreased so that the flux produced by the permanent magnet and travelling through the pole pieces also travels through the movable armature or piston along a first magnetic circuit, thereby attracting that armature or piston toward the pole pieces. At other times, the pulse current polarity is reversed, and the electromagnetic coils tend to increase the resultant reluctance of the pole pieces near the movable armature or piston, thereby diverting the magnetic flux produced by the permanent magnet away from the movable armature or piston, and that flux then runs through a second magnetic circuit that includes the opposite end armature. When this occurs, a compression spring located between the permanent magnet and the movable armature or piston will push the armature or piston to its opposite end travel position.

If the fluid medium is to be under a high pressure, then the movable piston or armature can be provided with lands and grooves around its outer surfaces (i.e., around its circumference if it is cylindrical in shape), and the fluid passageway between the inlet and outlet ports will be created along the grooves so that the movable armature or piston does not have to directly work against the pressure of the fluid medium. Any number of lands and grooves can be provided on the movable armature or piston, thereby making it into a spool for use as two-way, three-way, four-way, or other valve configuration. Furthermore, a separate spool piece can easily by attached to the magnetic piston or movable armature in which the separate spool piece would have multiple grooves and lands, thereby providing additional flow passageways to construct a multiple-operation valve.

An improved magnetically-powered motor vehicle is provided which utilizes several of the magnetically-powered linear displacement pumps described herein. The pumps are used to build up a hydraulic pressure (or another type of pressurized fluid) until enough pressure is available in an accumulator to drive an electrical generator by use of a hydraulic motor. Once the generator is on line, the electrical pulses needed to operate the magnetically-powered pumps can be provided by the generator, rather than by a battery that is carried by the motor vehicle. Once the hydraulic pressure builds up to a greater value that is sufficient to drive even larger hydraulic motors, these larger hydraulic motors can be used to individually turn the wheels of the motor vehicle. Several valves are needed to control the fluid paths during different periods of the start-up procedure of the motor vehicle, and these valves can either be standard on-off valves available in the prior art, or can be magnetically-powered on-off valves as described herein.

In an alternative embodiment of a magnetically-powered motor vehicle, the output of the electrical generator can be used to directly drive electrical DC motors that are located at each of the wheels of the motor vehicle. This motor vehicle design would greatly simplify the hydraulic system, but would then increase the complexity of the electrical system. In addition, the electrical generator would have to be much larger in capacity so that it could provide enough drive current for the individual DC motors at each of the wheels. As in the first embodiment of the magnetically-powered motor vehicle describe hereinabove, the electrical generator would also provide the necessary current pulses for operating the magnetically-powered linear displacement pumps once the pressure of the accumulator was built up to a certain minimum level.

In another alternative embodiment of the invention, a magnetically-powered linear alternator is provided having a strong permanent magnet with pole pieces made of a soft magnetic material which abut the sides of the permanent magnet at its north and south poles. The linear alternator includes two armatures (or one armature and a piston) made of soft magnetic material that provide magnetic circuit paths at each of the two ends of the pole pieces. At least one of the armatures (or the piston) is movable with respect to the permanent magnet, and is attached to the end of the permanent magnet by a compression spring. The pole pieces have an electromagnetic coil wound around them at locations near the movable armature or piston, and the coil has the capability of either increasing or decreasing the resultant reluctance of the pole pieces at a point near the movable armature or piston. When the coils are energized in a first polarity, the resultant reluctance of the pole pieces near the coils is decreased, so that the flux produced by the permanent magnet and flowing through the pole pieces travels through the movable armature or piston, rather than through the armature at the opposite end of the permanent magnet, thereby attracting the movable armature or piston toward the pole pieces.

When the polarity of the current is reversed, the electromagnetic coils tend to increase the resultant reluctance of the pole pieces near the movable armature or piston, thereby diverting the magnetic flux produced by the permanent magnet away from the magnetic circuit that includes the movable armature or piston, and this flux will then flow through the alternate magnetic circuit that includes the armature at the opposite end of the permanent magnet. When this occurs, the movable armature or piston is no longer attracted toward the pole pieces, and the compression spring pushes that movable armature or piston away from the pole pieces.

The magnetic movable armature or piston is mechanically attached to at least one other permanent magnet located proximally to at least one field coil, thereby making up at least one magneto. The number and size of the magnetos can be varied, depending upon the desired magnitude of voltage and current output. The overall linear alternator assembly would normally either include two permanent magnets to alternately pull the magnetic piston toward one or the other of these permanent magnets, or there would be a single permanent magnet having both end armatures movable which would both be connected by tie-rods so that the pole pieces at one or the other end of the permanent magnet are alternately attracting one or the other of the movable armatures toward the pole pieces. This latter arrangement would be more convenient for locating a set of magnetos at the ends of the assembly, thereby allowing for easy access to the electrical connections to and between the magnetos.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects, all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIGS. 7A and 7B are schematic/block diagrams of the electrical and magnetic circuits involved in the displacement device depicted in FIG. 6.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
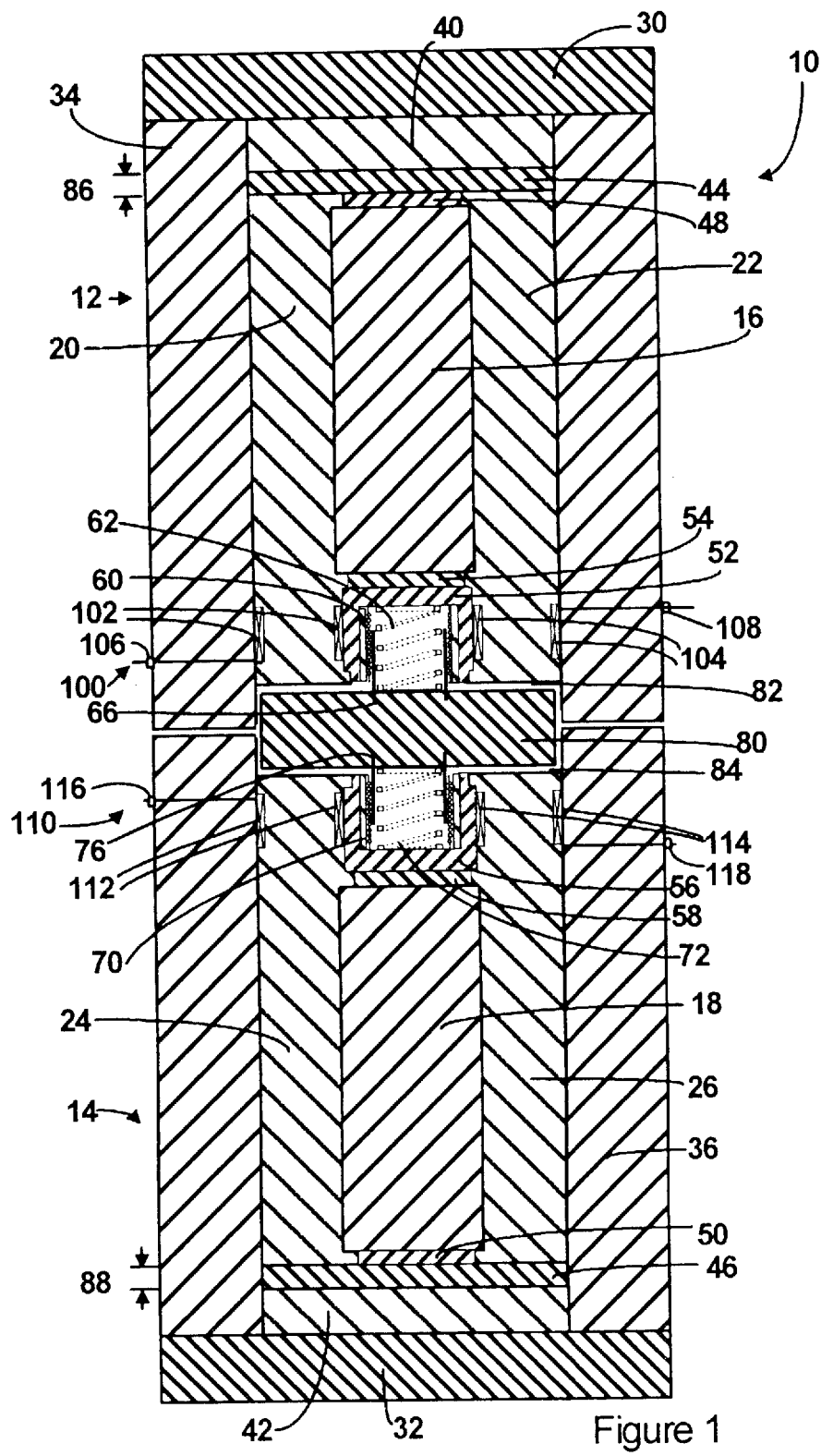
FIG. 1 is a top plan view in cross-section of a magnetically-powered linear displacement device constructed according to the principles of the present invention.

Referring now to the drawings, FIG. 1 depicts a magnetically-powered linear displacement device, generally designated by the index numeral 10, in a cut-away cross-section view essentially down the centerline of the device, which can act as a prime mover. Linear displacement device 10 is preferably arranged so that it is positioned in the horizontal plane, i.e. FIG. 1 would be a top elevational view. Linear displacement device 10 includes two major half-assemblies, as seen in FIG. 1, an upper half-assembly 12 and a lower half-assembly 14. The terms "upper" and "lower" in the previous sentence, of course, are not related to the physical elevation of the half-assemblies, but only their pictorial positions on FIG. 1, because linear displacement device 10 is positioned in the horizontal plane, and half-assembly 12 and half-assembly 14 are both at the same elevation.

At the center of each half-assembly is a permanent magnet, designated by the index numerals 16 and 18, respectively. Permanent magnets 16 and 18 are preferably made of a very high strength permanent magnetic material creating a high flux density, such as a neodymium iron boron material known as CRUMAX 4014™, manufactured by Crucible Magnetic Company, located in Elizabethtown, Ky. This preferred magnetic material has nominal magnetic properties of 12,900 Gauss for residual induction (Br), 12,300 Oersteds of Coercive force (Hc), and a maximum energy product (BHmax) of $40 \times 10^6$ GOe. The stronger the permanent magnet, the smaller linear displacement device 10 can be dimensioned, or the more powerful linear displacement device 10 can be made.

Within upper half-assembly 12, magnet 16 is sandwiched between two flat plates called pole pieces, which are designated by the index numerals 20 and 22. Similarly, lower half-assembly 14 has its permanent magnet 18 surrounded by essentially identical pole pieces, designated by the index numerals 24 and 26. Each of pole pieces 20, 22, 24, and 26 are preferably made of a magnetically "soft" material that exhibits no substantial magnetic retentivity while additionally exhibiting a high magnetic flux density capability. The preferred material for these pole pieces is 1010 steel, which has a flux density capability of 21,500 Gauss, high permeability, low hysteresis energy loss, and low eddy current loss in alternating flux applications. The surfaces of magnets 16 and 18 that abut pole pieces 20, 22, 24 and 26 are the North and South poles of those magnets.

Figure 4:
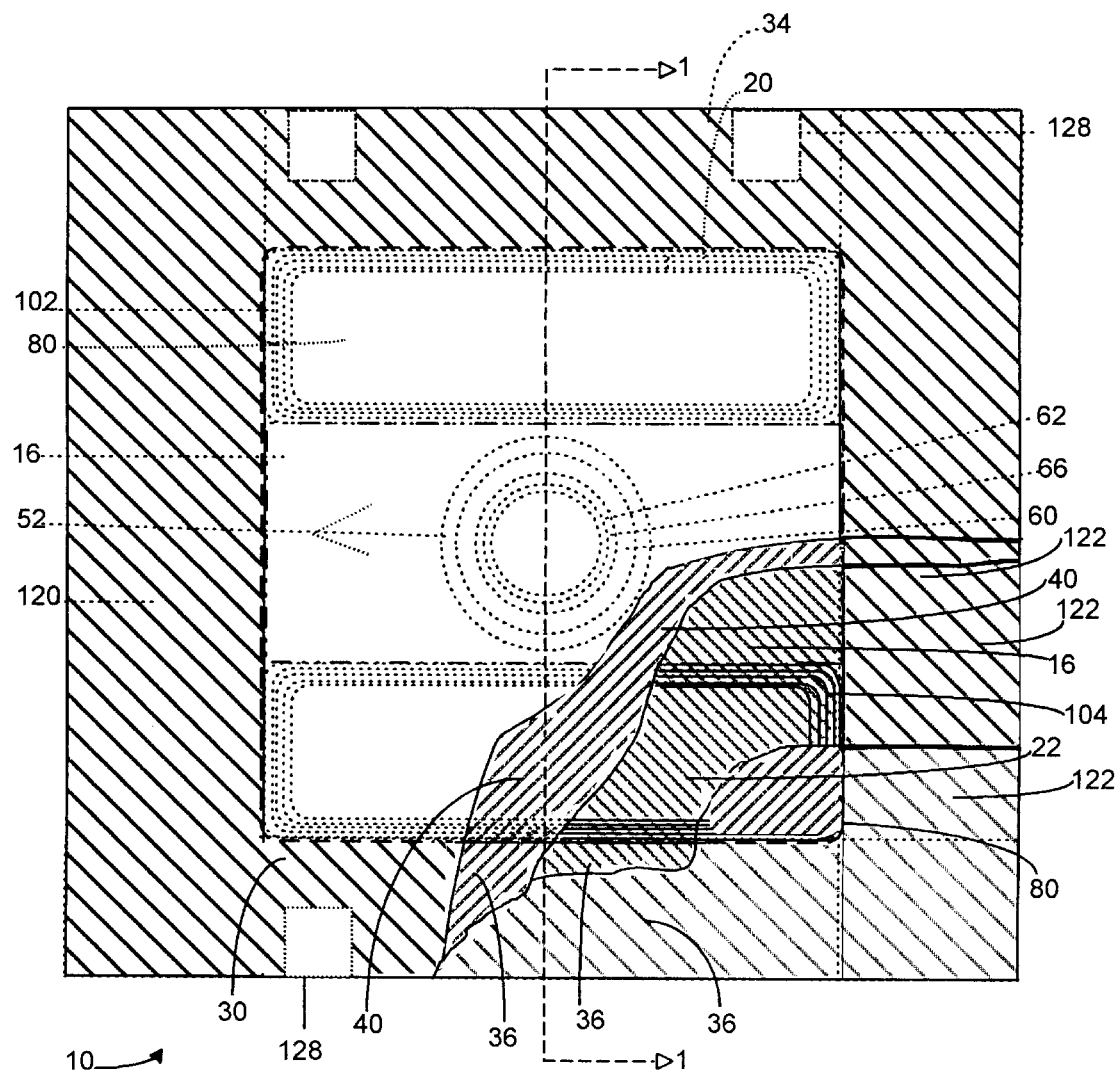
FIG. 4 is an end elevational view of the magnetically-powered linear displacement device depicted in FIG. 1.

Linear displacement device 10 is preferably encased by an aluminum housing, consisting, in FIG. 1, of an upper end piece 30, a lower end piece 32, and two side pieces 34 and 36 which run between the two end pieces 30 and 32, respectively, and two other side pieces 120 and 122 (see FIG. 4). Although the preferred material is aluminum for these housing pieces, the housing for linear displacement device 10 can be made of any non-magnetic material. The primary purpose of this non-magnetic housing is to prevent magnetic cross-talk from interfering with the operation of linear displacement device 10 and other adjacent similar linear displacement devices (not shown).

An upper armature 40 is mounted adjacent to upper end piece 30, and is preferably held in place by the housing pieces 30, 34, and 36. A lower armature 42 is similarly mounted adjacent to lower end piece 32. Both armatures 40 and 42 are preferably made of the same 1010 steel as is used to make up the pole pieces 20, 22, 24, and 26. Upper armature 40 is preferably spaced apart from pole pieces 20 and 22 by a spacer 44, which is preferably made of Micarda. Similarly, lower armature 42 is preferably spaced apart from pole pieces 24 and 26 by a similar Micarda spacer 46. These Micarda spacers 44 and 46 are used to created a certain gap in the magnetic circuits of linear displacement device 10, and these magnetic circuits will be described in full detail hereinbelow.

The upper permanent magnet 16 is attached to slots that are machined in the pole pieces 20 and 22. Filler material consisting of an epoxy material is used, at the location designated by index numeral 48. The lower permanent magnet 18 is similarly attached, and the location of its epoxy material is designated by the index numeral 50. The partial assembly described above for linear displacement device 10 comprises non-moving components that are preferably mounted such that there are no gaps between the mating surfaces of those components made of magnetic materials, with the exception of armatures 40 and 42. For example, the sides of magnet 16 are preferably touching the sides of pole pieces 20 and 22. In a similar manner, the opposite sides of pole pieces 20 and 22 are preferably touching the sides of the aluminum housing side pieces 34 and 36. While FIG. 1 depicts magnets, pole pieces, and housing pieces that are rectangular or square in configuration, it will be understood that rounded, cylindrically-shaped pieces could also be utilized to make up linear displacement device 10, in which the rounded sides of the various components would be in contact with the opposite mating rounded sides of the other adjacent components.

A cylinder and spring assembly block, preferably made of aluminum and designated by the index numeral 52, is mounted adjacent to the inner end of permanent magnet 16, and is held in place by a machined slot in pole pieces 20 and 22. A filler layer of epoxy material is positioned at the location designated by the index number 54. A similar aluminum assembly block support 56 is mounted to the inner end of permanent magnet 18, and is held in place by the machined slot in the pole pieces. The filler material consisting of epoxy is positioned at the location designated by the index number 58. The epoxy materials described hereinabove are preferably thermally conductive, and a suitable epoxy is DEVCON ALUMINUM PUTTY EPOXY™, manufactured by Devcon, and available at all major industrial supply houses.

A linear ball bushing assembly, designated by the index number 60, is press fit into the cylinder and spring assembly block 52. Linear ball bushing assembly 60 is preferably made of aluminum, or some other non-magnetic material. Linear ball bushing assembly 60 is designed to receive and allow linear movement of a hollow, cylindrical projection 66 that acts as a guide tube and fits around the outer surfaces of a non-magnetic compression spring that is designated by the index number 62.

A similar linear ball bushing assembly 70 is affixed to the cylinder and spring assembly block 56. The linear movement of another hollow cylindrical projection 76 that acts a guide tube for movable piston 80, and which fits around the outer surfaces of a non-magnetic compression spring 72, is accommodated by the insertion of this cylinder or hollow projection 76 into the linear ball bushing assembly.

Guide tubes 66 and 76 are fabricated from non-magnetic material and are mechanically connected to a movable piston 80, which preferably has a thickness sufficient to carry the maximum flux in the magnetic circuits. Guide tubes 66 and 76 confine the movements of piston 80 to be linearly directed along the longitudinal axis of linear displacement device 10, which is depicted in FIG. 1 as an up-and-down motion. In FIG. 1, piston 80 is depicted in its central position, and an air gap along its upper surface is located at the index numeral 82, and at the opposite side of air gap 82 are the inner ends of pole pieces 20 and 22, respectively. A similar lower air gap can be seen in FIG. 1 at the index numeral 84, and is located between the lower surface of piston 80 and the inner ends of pole pieces 24 and 26 respectively.

It should be noted that the "magnetic" gaps designated by the index numerals 86 and 88, between armature 40 and pole pieces 20 and 22, and between armature 42 and pole pieces 24 and 26, respectively, are preferable greater than the air gaps 82 and 84. Since movable piston 80 is preferably square or rectangular in shape, air gaps 82 and 84 are correspondingly square or rectangular in shape, while having their central portions occupied by guide tubes 66 and 76 and linear ball bushing assemblies 60 and 70, respectively. Piston 80 is preferably made of the same 1010 steel material as is used for the pole pieces (e.g., pole piece 20), but can be manufactured from a material that can handle a higher level of flux density, thereby allowing the mass of the piston to be decreased. This modification would allow a higher frequency of operation due to the movable piston's lower mass.

The components of each half-assembly 12 and 14 are preferably made to nearly identical dimensions, thereby creating nearly identical magnetic circuits within linear displacement device 10. The upper permanent magnet 16 can create two parallel magnetic circuits designated by the index numerals 90 and 92, as best viewed in FIGS. 2 and 3, respectively. Magnetic circuit 90 travels through magnet 16, pole pieces 20 and 22, and through movable piston 80. Magnetic circuit 92 also travels through magnet 16 and pole pieces 20 and 22, and additionally travels through armature 40, rather than movable piston 80. Only one of these magnetic circuits will contain appreciable flux density at any given moment, and which circuit is presently active will depend upon the comparative reluctance of the two magnetic circuits 90 and 92 at any particular moment. The operation of these circuits will be described in detail hereinbelow.

Figure 2:
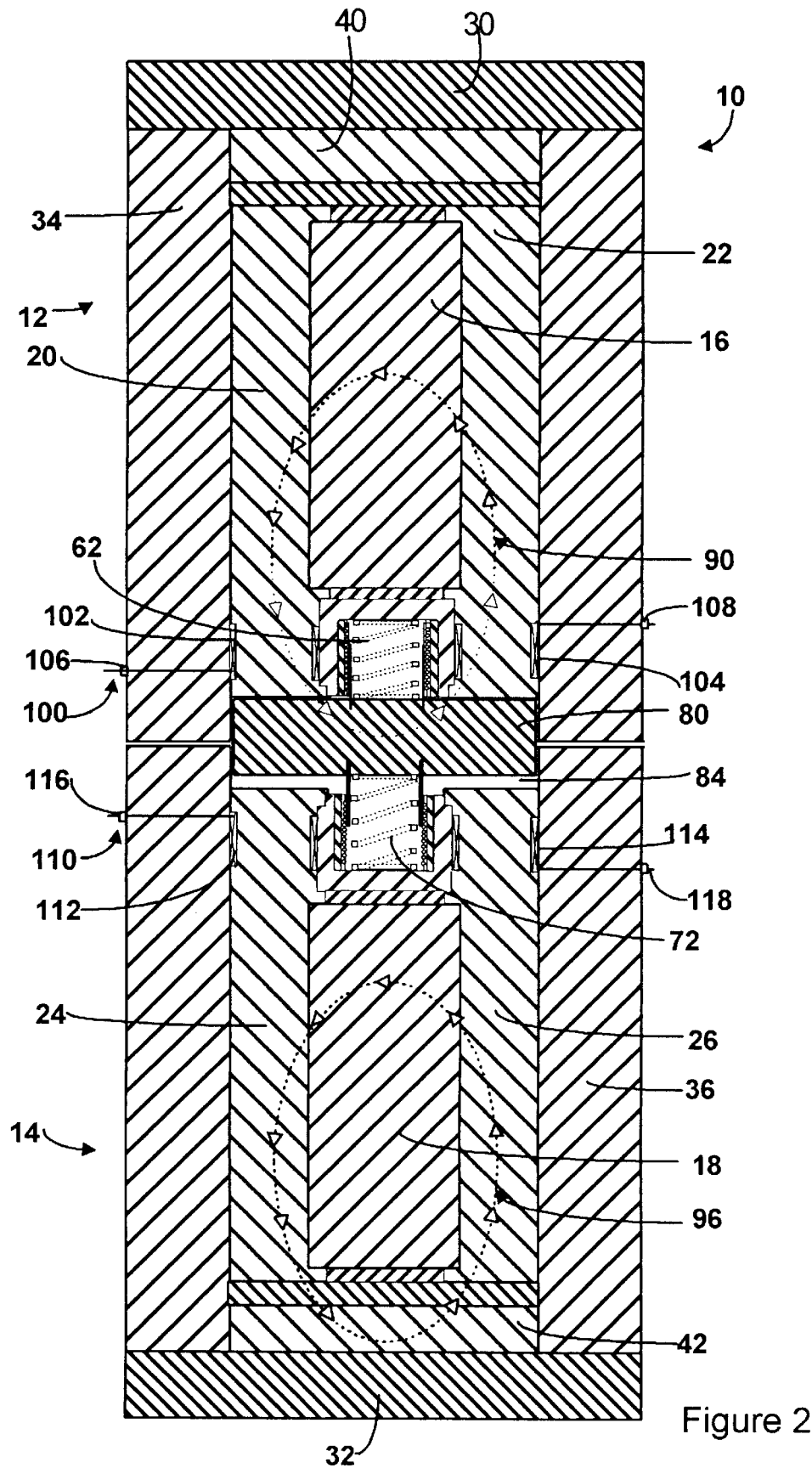
FIG. 2 is a top plan view in cross-section of the magnetically-powered linear displacement device depicted in FIG. 1 in which the movable piston is located in its "upward" position.
Figure 3:
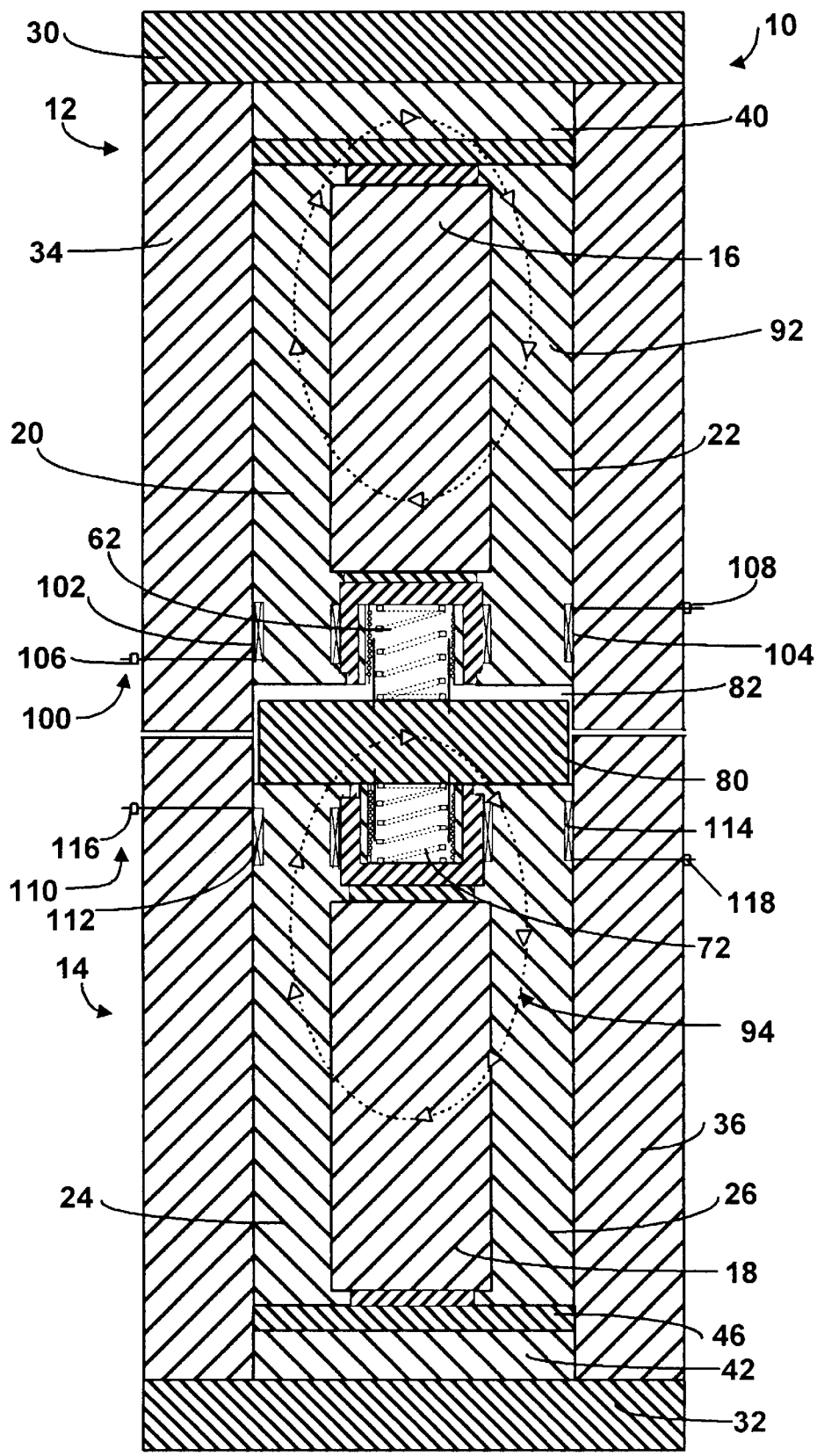
FIG. 3 is a top plan view in cross-section of the magnetically-powered linear displacement device depicted in FIG. 1 in which the movable piston is located in its "downward" position.

In a similar manner, permanent magnet 18 can create two parallel magnetic circuits 94 and 96, as best viewed in FIGS. 3 and 2, respectively. Magnetic circuit 94 travels through permanent magnet 18 and pole pieces 24 and 26, and also through movable piston 80. Magnetic circuit 96 also travels through magnet 18 and pole pieces 24 and 26, but travels through armature 42 rather than through movable piston 80. The choice between magnetic circuits 94 and 96 as to which one is presently active (carrying appreciable flux density) is dependent upon the comparative reluctance between these two magnetic circuits at a particular moment. This will be discussed in more detail hereinbelow.

Upper half-assembly 12 contains an electrical circuit, generally designated by the index numeral 100. Electrical circuit 100 travels through two mechanically separate windings or coils, designated by the index numerals 102 and 104. Coil 102 is wrapped around a recess within the outer walls of pole piece 20, and coil 104 is wrapped around a similar recess within the outer walls of pole piece 22. Whereas coils 102 and 104 are mechanically separate, they are electrically common, in that the electrical circuit 100 begins at an input terminal designated by index numeral 106, and continues to coil 102. Electrical circuit 100 then travels from the opposite side of coil 102 over to coil 104, by a wire that is not shown in FIG. 1. Electrical circuit 100 continues through coil 104, and is output at the opposite side of coil 104 as a return path, which is connected to a terminal designated by the index numeral 108.

It is important to note that coils 102 and 104 are preferably opposite in polarity, i.e., a current flowing from input terminal 106 to return path terminal 108 will set up an electromagnetic field in coil 102 having the vector direction from top-to-bottom in FIG. 1, however, the electromagnetic field induced by coil 104 will have a vector direction from bottom-to-top as viewed in FIG. 1. When this magnetic field direction occurs, the resultant reluctance of magnetic circuit 90 is decreased, and the flux density produced by permanent magnet 16 will flow along magnetic circuit 90 rather than magnetic circuit 92, thereby flowing through movable piston 80 and attracting it toward pole pieces 20 and 22 until piston 80 contacts the ends of pole pieces 20 and 22. Once that occurs, piston 80 cannot move any further in that direction, and compression spring 62 is fully compressed to its design limit.

If the current flow through electrical circuit 100 is reversed, i.e. the direction of current flow is from return path terminal 108 to input terminal 106, then the electromagnetic fields set up by coils 102 and 104 will be in the opposite directions, respectively, as described in the paragraph above. When that occurs, the resultant reluctance of magnetic circuit 90 will increase, and the flux produced by permanent magnet 16 will flow through magnetic circuit 92 instead of magnetic circuit 90. When this occurs, movable piston 80 is no longer attracted to pole pieces 20 and 22, and compression spring 62 tends to push movable piston 80 away from pole pieces 20 and 22, while flux now passes through the armature 40.

A second electrical circuit 110 is located in the lower half-assembly 14 of linear displacement device 10. Electrical circuit 110 includes two mechanically separate windings or coils 112 and 114, which are wrapped around pole pieces 24 and 26, respectively, in a similar manner as the coils 102 and 104 described above. Electrical circuit 110 has an input terminal 116, and a return terminal 118. Coils 112 and 114, while mechanically separate, are electrically common in that a wire (not shown) is run between one end of coil 112 (the end not connected to input terminal 116) and another end of coil 114 (the end not connected to return terminal 118).

In a similar manner to the coils 102 and 104, coils 112 and 114 have opposite polarity with respect to one another. For example, if a current is directed into input terminal 116, and returns via the return terminal 118, coil 112 will induce an electromagnetic field that has a vector direction from top-to-bottom as viewed in FIG. 1. During this moment, coil 114 induces an electromagnetic field that has the vector direction from bottom-to-top as viewed in FIG. 1. During this current pulse, the resultant reluctance of pole pieces 24 and 26 at coils 112 and 114 is increased such that the flux density created by permanent magnet 18 travels through magnetic circuit 96 rather than through magnetic circuit 94 (see FIG. 2). When this occurs, movable piston 80 is not attracted toward pole pieces 24 and 26, and compression spring 72 tends to push movable piston 80 away from pole pieces 24 and 26.

When the current direction of electrical circuit 110 is reversed, the directions of the electromagnetic fields induced by coils 112 and 114 are reversed, respectively, which decreases the resultant reluctance of pole pieces 24 and 26 at coils 112 and 114. When this occurs, the flux density produced by permanent magnet 18 travels through magnetic circuit 94 rather than magnetic circuit 96, and flux now passes through movable piston 80 and is, therefore, attracted in a direction toward pole pieces 24 and 26 until it contacts the ends of those pole pieces. When this occurs, the compression spring 72 is fully compressed to its design limit.

It is preferred that the electrical circuits, 100 and 110 be connected in parallel, such that input terminal 106 is electrically connected to return terminal 118, and return terminal 108 is connected to input terminal 116. When connected in this configuration, it can be easily discerned from the above description and FIGS. 2 and 3 that when magnetic circuit 90 is active, so is magnetic circuit 96, and movable piston 80 is urged upward (as viewed in FIG. 2) by two factors: first, since magnetic circuit 90 presently has flux density flowing through it and includes piston 80 in its circuit path, movable piston 80 is attracted toward pole pieces 20 and 22; second, since magnetic circuit 96 is active, rather than magnetic circuit 94, compression spring 72 will act to further urge movable piston 80 in the upward direction. This situation will occur if the polarity of the electrical circuit is such that a positive voltage is connected to input terminal 106 (which also is connected to return terminal 118), and the negative side of that voltage is connected to return terminal 108 (which is also connected to input terminal 116).

If the voltage polarity is reversed, then the magnetic circuit paths 92 and 94 become active (as viewed in FIG. 3), and movable piston 80 is urged downward (as viewed in FIG. 3) by two forces: first, since magnetic circuit 94 is active, and a magnetic flux travels through movable piston 80 as part of magnetic circuit 94, movable piston 80 is attracted to pole pieces 24 and 26; second, since magnetic circuit 92 is active, rather than magnetic circuit 90, compression spring 62 tends to push movable piston 80 in a downward direction.

If the current or voltage directions are periodically reversed in electrical circuits 100 and 110, movable piston 80 will tend to be drawn upward, then downward, then upward, etc. in a repeatable fashion, thereby providing a linear reciprocating motion. This motion will continue so long as electrical circuits 100 and 110 continue to be alternately pulsed with opposite polarity pulses, which will tend to shift the flux density from one magnetic circuit to another, as described above. It will be understood that an alternating current sine wave could be used as the voltage or current provided into electrical circuits 100 or 110, however, the preferred waveform for these voltages or currents is a series of short time duration positive and negative pulses, similar to that provided by a square wave generator, but having a very low duty cycle.

Permanent magnets 16 and 18 contain a sufficiently high retentivity to provide sufficient energy to cause a linear displacement to occur in piston 80, while being positioned in the force field surrounding the permanent magnets' magnetic circuits 90, 92, 94, and 96. The force that is exerted during this displacement and the magnitude of the displacement constitute the work that is provided by the combined potential energy that is stored in permanent magnets 16 and 18, the force field that surrounds the magnet material, the magnetic flux density capability of the material of pole pieces 20, 22, 24, and 26, and the material that is used for movable piston 80. The work that is accomplished can be used to compress a liquid or a gas or can be used to cut lines of force, as in a magneto or linear alternator, or can be used directly as oscillatory power to drive a mechanical output device or engine.

As described above, the arrangement of the permanent magnets, the pole pieces, the movable piston and the armature comprise a magnetic circuit that provides parallel paths for the magnetic flux generated by the permanent magnets. The direction or path which the magnetic flux takes is controlled by the path of least reluctance in the magnetic circuit. A few of the important characteristics of the configuration of the present invention are that:

(1) For a given half assembly, the magnetic field exerts a strong force at one end while exerting almost no force at the other end.

(2) For a given half assembly, the magnetic poles can be switched from one end to the other at will.

(3) Each of the magnetic circuits will "remember" the last direction of greatest pull.

(4) The movable piston is mechanically pushed as well as magnetically attracted (pulled) simultaneously during a given displacement stroke.

(5) The two half-assemblies operate to generate automatically identical conditions (in alternating sequence) for the displacement stroke in the opposite direction.

(6) Only a low level pulse-type current signal is necessary in order to cause the piston movements described above.

(7) The use of the magneto and magneto circuits automatically provides a polarity-reversing type of current source to be made available for a self-sustaining operation of the displacement device.

(8) The displacement device can easily be miniaturized or magnified in size.

(9) With only a slight modification the device can be coupled in a parallel or series connection to increase its force or displacement output.

(10) The incorporation of a magneto to the device yields effective output over input efficiencies approaching infinity.

As described hereinabove, the present invention uses magnets 16 and 18 which are each sandwiched between two outer flat pole pieces (20 and 22, 24 and 26, respectively) to concentrate the flux for maximum pull. The movable piston 80 completes the magnetic circuit on the one end and a matching stationary armature (40 or 42) completes the circuit on the opposite end. In order to accommodate the control windings (coils 102, 104, 106, and 108), the pole pieces are preferably extended somewhat beyond the magnets. During operation, once piston 80 is moved to its upper travel position due to a shift in flux caused by a current pulse (see FIG. 2), the linear displacement device 10 "remembers" the most recent active magnetic circuit paths (90 and 96) to retain indefinitely an imbalance of the magnetic induction between the two parallel paths. When release is desired, a reverse pulse to the control windings shifts the flux of magnetic circuit 90 away from the piston 80 and into stationary armature 40 as shown in FIG. 3 (as magnetic circuit 92), where it is retained until required.

A low level of energy only is required to shift the flux in the pole pieces using the configuration of linear displacement device 10. The main magnetic induction in the permanent magnets is undisturbed. A momentary opposing force field is induced by the current pulses into the pole pieces at locations near the movable piston 80. This induced magnetic field offers an opposing field to the magnetic flux that exists in the pole material's magnetic circuit (e.g., circuit 90). Consequently, the magnetic flux shifts and starts to flow through the other leg (the "armature leg") of the parallel magnetic circuit that offers less resistance (i.e., reluctance) to the magnetic flux. At this point the displacement piston 80 experiences a drastic decrease in magnetic flux resulting in a negligible tractive force.

Upon the application of the next current pulse (having the opposite polarity) into the electromagnetic circuit 100, the resultant reluctance of the "piston leg" of the magnetic circuit (i.e., circuit 90) is greatly diminished, and the bulk of the magnetic flux in the overall magnetic circuit shifts from the "armature" leg (circuit 92) towards the leg of the circuit that offers the least resistance (i.e., reluctance) which is the "piston" leg, circuit 90. The pole pieces 20 and 22 near piston 80 then become magnetically energized which in turn induces a tractive force into movable piston 80, and the action of the magnetic field on the movable piston causes piston 80 to displace under the tractive force until it is brought into direct contact with the pole surfaces at air gap 82. The force capability that is associated with this displacement depends on several factors: (1) the flux density in the portions of pole pieces 20 and 22 that are nearest to movable piston 80, (2) the magnitude of the areas of the pole face (at air gap 82) and the movable piston face area and cross-section, and (3) the distance between movable piston 80 and ends of pole pieces 20 and 22. The "reach-out" capability (the force exerted on movable piston 80 at the maximum distance point) will be determined from the overall design layout of the linear displacement device 10, plus the magnetic characteristics of permanent magnet 16, the magnetic properties of the pole piece material, the armature material, and the movable piston material. This above recitation, of course, only considers the components of the upper half-assembly 12, and it will be understood that the lower half-assembly 14 operates according to the same principles. An end view with certain cut-away sections of displacement device 10 is provided in FIG. 4.

In the illustrated embodiment of FIG. 1, an exemplary construction of linear displacement device 10 and its operation are described below. When the compression springs 62 and 72 are elasticity compressed by the permanent magnet force field acting upon movable piston 80, the maximum potential energy stored in one of these springs exists when piston 80 is at a zero distance from the pole faces of one of the half-assemblies 12 or 14, as depicted in FIGS. 2 and 3. Springs 62 and 72 operate under conditions of simple harmonic motion, and their purpose is to take advantage of the non-linear force vs. distance behavior that results from the affects of the magnetic force field generated by the permanent magnets 16 and 18 and their associated magnetic circuits 90 and 94 in the air gap regions that exist between movable piston 80 and the pole faces (i.e., air gaps 82 and 84).

A plot of the force versus distance behavior is presented in FIG. 5, for a linear displacement device 10 constructed of the materials described hereinabove, and having the approximate dimensions listed below: magnets 16, 18—2"× 4"×5" (5.1 cm×10.2 cm×12.7 cm); poles pieces 20, 22, 24, 26—1.25"×4"×8" (3.2 cm×10.2 cm×20.3 cm); piston 80—1"×4"×4" (2.5 cm×10.2 cm×10.2 cm); armatures 40 and 42—1"×4"×4" (2.5 cm×10.2 cm×10.2 cm); housing walls 34 and 36—1"×4"×20" (2.5 cm×10.2 cm×50.8 cm); housing end pieces 30 and 32—6"×6"×1" (15.2 cm×15.2 cm×2.5 cm); and "left" and "right" side pieces 120 and 122 (see FIG. 4)—6"×6"×20" (15.2 cm×15.2 cm×50.8 cm). Springs 62 and 72 are preferably high-strength, fatigue-resistant, die springs having a shot peen surface, and they are variable-rate (or compound) springs.

Figure 5:
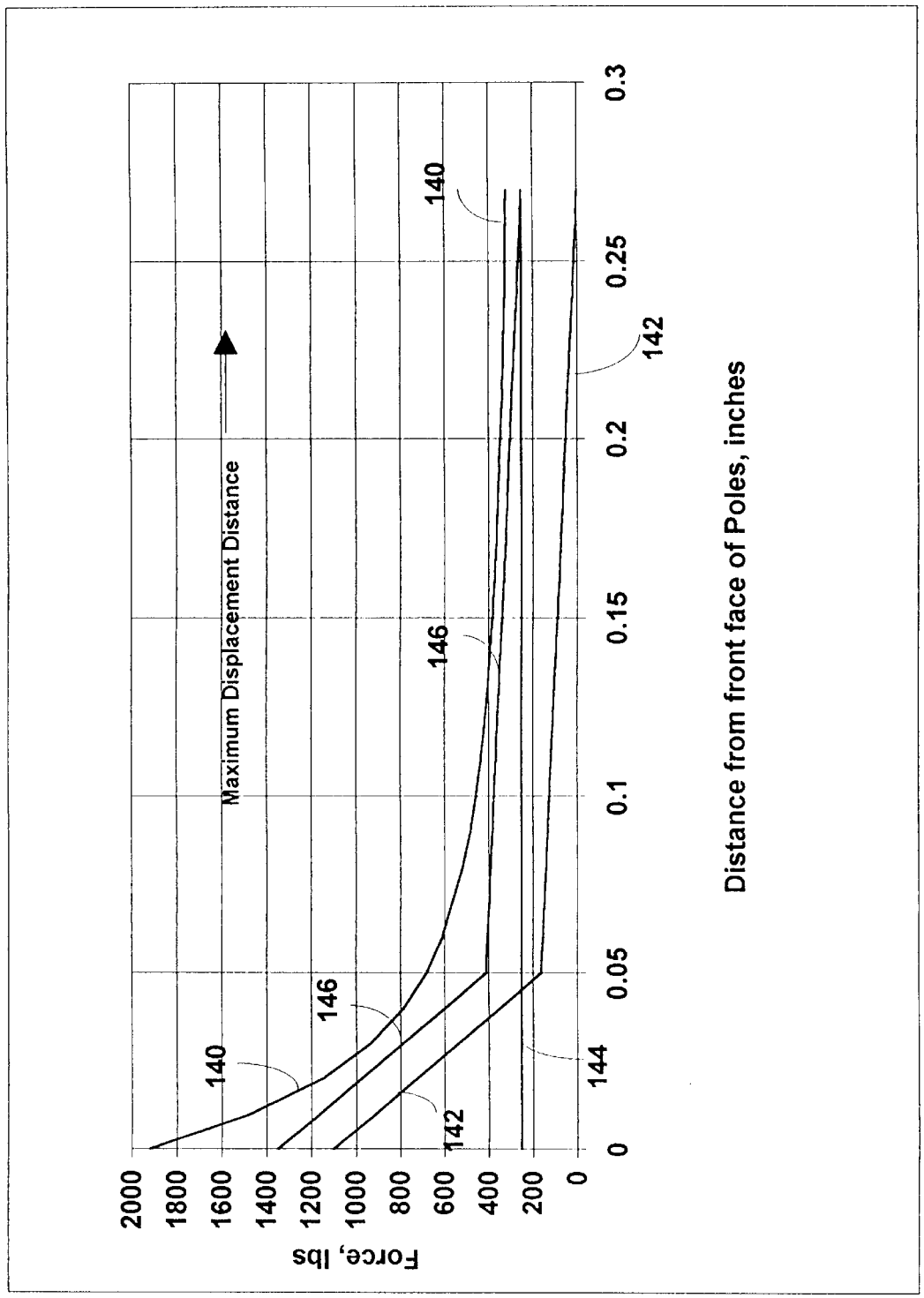
FIG. 5 is a graph of the force vs. distance characteristics of the magnetically-powered linear displacement device depicted in FIG. 1.

As can be seen in FIG. 5, a maximum work force requirement is chosen to be 250 pounds, as indicated by the curve designated by the index numeral 144, which exists at a distance of 0.25 inches as measured from the front face of either of the pole assemblies (pole pieces 20 and 22, and 24 and 26) that are adjacent to movable piston 80. The tractive force capacity of magnetic half-assemblies 12 and 14 at this point is 325 pounds each, as indicated by the curve designated by the index numeral 140. As the distance between piston 80 and a given set of pole pieces decreases, the tractive force level is dramatically increased until it reaches a maximum value of approximately 1900 pounds at the zero distance point (see curve 140).

Obviously, if an opposing force exists at the 0.25 inches distance point that is equal to the 325 pounds, piston 80 would be in a condition of full equilibrium and subsequently would not move from its position. Therefore, in order to attain the maximum displacement and the highest force at the maximum displacement point, the permanent magnet material must have the capability to induce a flux density into the piston 80 via the pole pieces 20 and 22 that is sufficient to yield a tractive force that is greater than the 250 pounds of work force selected for the 0.25 inches distance point. As shown in FIG. 5, the tractive force available at the 0.25 inches distance point is approximately 325 pounds, which is obviously sufficient to overcome the work load of 250 pounds as it moves from a distance of 0.25 inches from the attracting pole pieces to the zero distance point.

As can be seen in the FIG. 5, the magnetic tractive force (curve 140) increases significantly as the distance is decreased between pole pieces and the piston. Therefore, to make use of the excess energy, that yields forces greater than that required to accommodate the work load required in the cycle, the excess energy is used to compress the compression springs 62 and 72. Using this technique the stored potential energy in the compression springs will be available to push movable piston 80 to the opposite set of pole pieces (20 and 22, or 24 and 26) at the instant the magnetic flux that exists in movable piston 80 shifts to the armature leg of the magnetic circuit being discussed (armature 40 or 42). Furthermore, at this point, the required work is also completed as movable piston 80 reaches the zero distance point between itself and the pole pieces of interest. Therefore, the total energy that is stored in the compression springs is available for use to push movable piston 80 to the opposite magnetic half-assembly 12 or 14. The net affect of this application of the compression springs 62 and 72 is to increase the force and the reach-out capability of a given permanent magnet and pole material. Obviously, with the increase in distance, or reach-out, the volumetric capability of the overall assembly is proportionally increased.

The use of compression springs 62 and 72 also provides for a lower input current and for a shorter pulse duration in the input electromagnetic circuits 100 and 110. These improvements are due to the fact that the maximum potential energy stored in the springs is significant and the level of stored energy is only slightly less than the sum of the maximum tractive potential energy generated by permanent magnets 16 and 18, their associated magnetic circuits and force fields acting upon movable piston 80, minus the energy that is required to perform the work accomplished by the movable piston's displacement. Consequently, only a portion of the magnetic flux that is established in movable piston 80 that is due to the tractive force of the permanent magnet's circuit 90 or 94, at the zero distance point in the cycle, is required to be electro-magnetically opposed. The potential energy or repulsive force retained in springs 62 or 72 will then react on the piston 80 as soon as the tractive force of the permanent magnet 16 or 18 is less that the repulsive force available in the spring. Subsequently, this action causes piston 80 to be displaced in the opposite direction.

In general, the use of compression springs 62 and 72 as shown in FIG. 1 greatly enhances the overall performance of linear displacement device 10, and apparent efficiency factors from 8 to 12 are to be expected. Obviously, with these types of apparent efficiencies, there is ample energy available to drive one or more magnetos which can supply the input power for the low power pulse required to drive electrical circuits 100 and 110. It will be understood that air gaps 82 and 84 could be filled with a gas to replace the need for compression springs 62 and 72, as the trapped gas will perform as a non-linear spring as it is alternately compressed and decompressed.

In general, the preferred embodiment of linear displacement device 10 will operate at a cyclic frequency of approximately 10 to 50 Hz as defined by the input current reversal frequency. In this frequency range pole pieces 20, 22, 24 and 26 can be fabricated from solid material. However, in order to minimize eddy current losses should the frequency exceed the 50 Hz level, it is recommended that laminated pole material be employed. In the illustrated embodiment of FIG. 10, the recommended frequency of application is 15 Hz, along with a pulse current of 4 Amperes and 20 Volts (approximately 80 watts of electrical power) for a pulse period of 10 milliseconds (ms) is required per displacement stroke. Since two pulses are required to complete one cycle, the total average input power required per cycle is 160 watts over a 20 ms time period, or 3.2 watt seconds. Using a 15 Hz frequency yields 48 watt seconds, or 35.41 pound-feet/second, or 0.064 horsepower.

The power output of the illustrated embodiment of linear displacement device 10 is 250 pounds of force times the displacement of 0.25 inch, which equals 62.5 inch pounds/stroke, times two strokes per cycle equals 125 inch pounds/cycle×15 hertz frequency equals 1875 inch pounds/second. This is equal to 156.25 pound-feet/second or 0.284 horsepower.

The apparent efficiency of the illustrated embodiment of linear displacement device 10, neglecting friction, is 4.438, or 443.8 percent, which is calculated without the use of the compression springs. The overall efficiency will increase even more using the stored energy in the compression springs 62 and 72 to increase the volumetric and force capacity. Additionally, the pulse period and wattage required will be reduced as a result of the application of the compression springs.

It is important to note that the energy capability of the permanent magnets selected and the energy placed into the springs on a per cycle basis by the permanent magnets is considerably greater than the energy associated with the actual work being accomplished in the displacement cycle. Therefore, with consideration to the overall efficiency of linear displacement device 10, i.e., the energy contained in the device divided by the energy output of the device, yields an estimated value in the range of 15–20 percent, which is very low compared to the 400 percent range of apparent efficiency. This high apparent efficiency is due to the fact that the input energy required to create a high reluctance (resistance or obstacle) to the flow of magnetic flux through the magnetic circuits 90, 92, 94 and 96 is relatively small compared to the stored potential energy that is contained in the permanent magnets 16 and 18 and the associated force field that surrounds the magnets. Additionally, the work (the force over a distance) that piston 80 overcomes on a per cycle basis for the preferred embodiment is approximately four to five times greater than the energy that is required on a per cycle basis to provide two short duration low current pulses to the two electromagnetic induction circuits 100 and 110 that are positioned on the pole pieces 20, 22, 24 and 26 of each magnetic half-assembly 12 and 14. Additionally, there is also stored potential energy that exists in that portion of the pole pieces that are located within the coils of 102, 104, 112 and 114.

As linear displacement device 10 is energized, the magnetic circuits are capable of maintaining stored energy. It is important to note that the permanent magnets 16 and 18, the pole piece material (for pole pieces 20, 22, 24 and 26), the force field that exists through the open circuit portions of magnetic circuits 90, 92, 94 and 96, plus the armatures 40 and 42 and movable piston 80, each contain the inherent physical capability to store energy and to interact with each other as the cycle progresses in such a way so that the basic laws of the conservation of energy remain satisfied.

Figure 6:
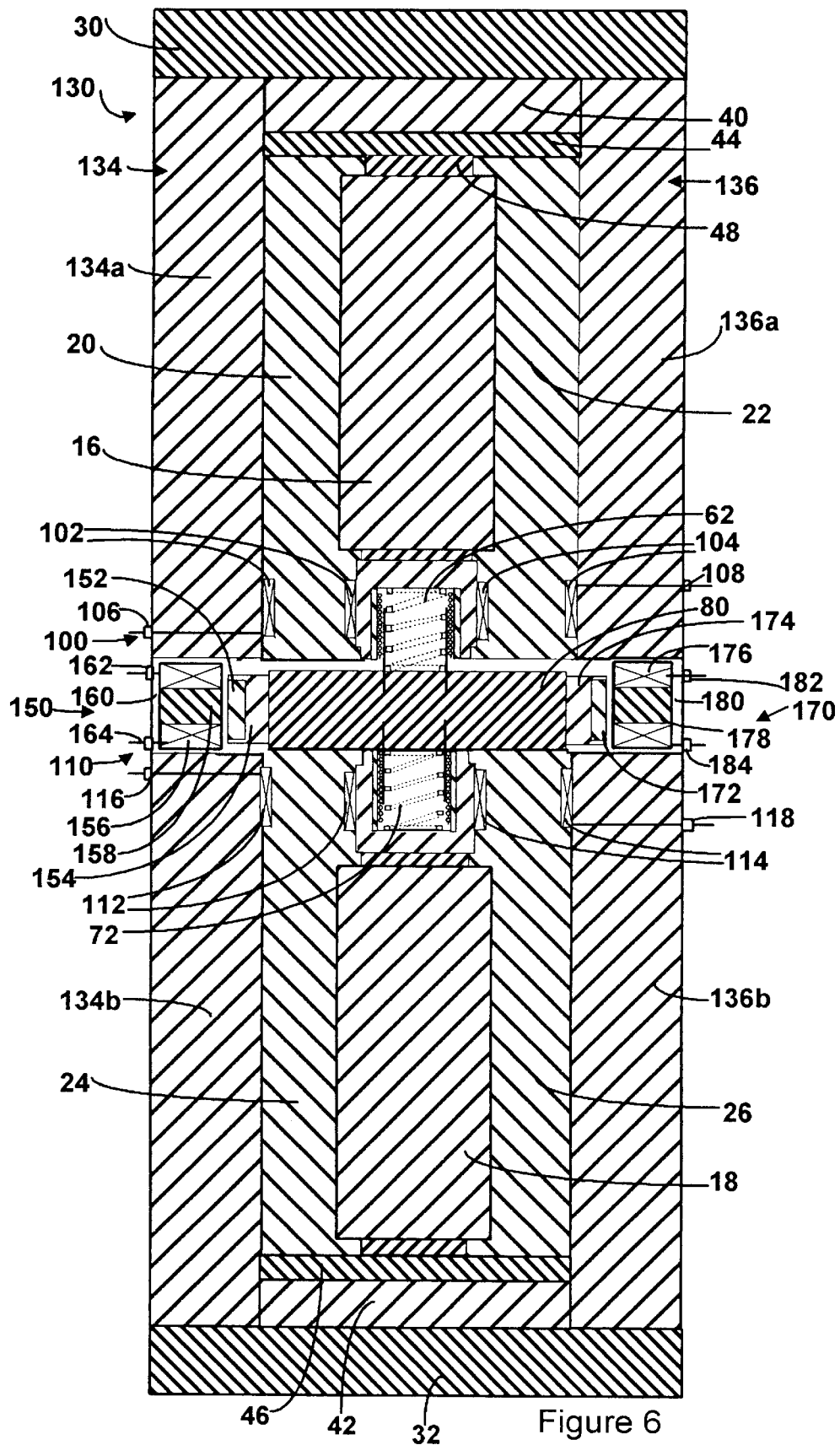
FIG. 6 is a top plan view in cross-section of a magnetically-powered linear displacement device similar in construction to that of FIG. 1 with the addition of a pair of magnetos.

A magneto circuit can be incorporated into displacement device 10 to create an overall more efficient displacement device, such as that depicted in FIG. 6 by the index numeral 130. Two separate magneto assemblies, designated by the index numerals 150 and 170, are depicted in the illustrated embodiment of FIG. 6. The movable portions of these magnetos is provided by individual permanent magnets 152 and 172, respectively, and each of these magnets is mounted to an aluminum support 154 and 174, respectively, which are attached to the sides of piston 80. It will be understood that support blocks 154 and 174 are preferably aluminum, however, they can be constructed of any type of non-magnetic material. As shown in FIG. 6, magnets 152 and 172 are located beyond the boundaries of magnetic circuits 90 and 94 (see FIGS. 2 and 3) that ultimately flow through piston 80, and are magnetically isolated by the aluminum supports 154 and 174.

Figure 7A:
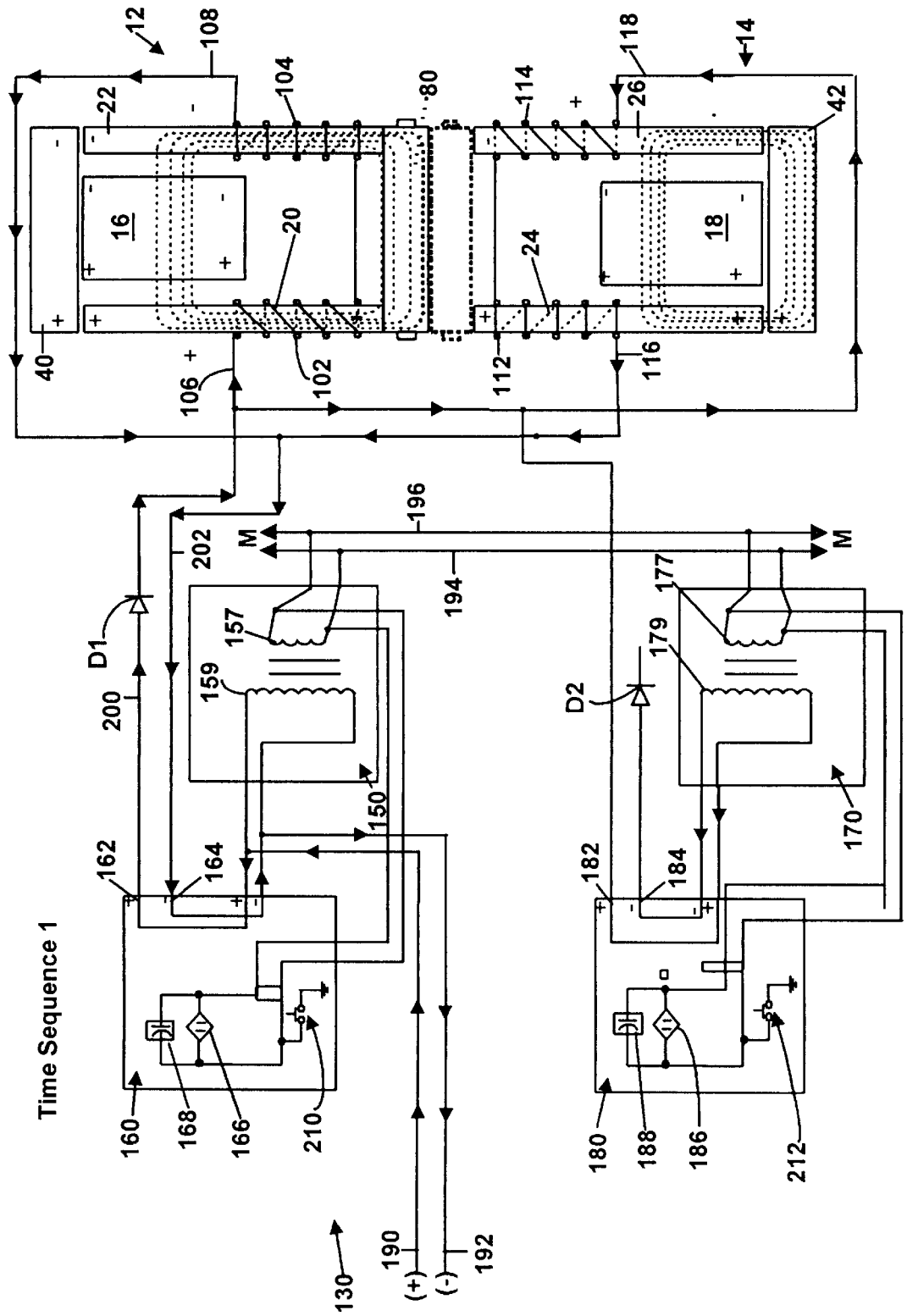

The stationary portion of magneto assemblies 150 and 170 mainly comprise a field coil 156 and 176, respectively, and a pole piece 158 and 178, respectively, with which the field coils are wound around. A schematic drawing including the coil assemblies is depicted in FIG. 7A. Field coils 156 and 176 each comprise two windings, which are identified by the index numerals 157, 159, and 177, 179, respectively. The secondary windings 159 and 179 each contain a large number of turns so that a sufficient voltage is produced every time the permanent magnets 152 and 172 are in the correct position to induce the maximum voltage into the primary windings 157 and 177 and secondary windings 159 and 179 of each field coil 156 and 176, respectively. At this point, the electrical circuit is switched open in the primary windings 157 and 177 using solid state switches designated by the index numerals 166 and 186, respectively. This action causes the magnetic fields to rapidly collapse, and the rapidly collapsing magnetic fields in the secondary windings 159 and 179 induce a high voltage pulse into the electric circuits 100 and 110. Electronic switching devices, such as transistors or SCR's are preferred devices to perform the switching task. These devices are contained in electrical circuits 160 or 180, each of which preferably also contain a capacitor 168 or 188 for storing the electrical energy until needed as well as to provide a mechanism to force the collapsing field current that is generated in the secondary windings 159 and 179 to flow through circuits 100 and 110, and not across the switching mechanism contained in circuits 160 and 180.

Magneto assembly 150 is placed within the "left" aluminum housing side piece (appearing in FIG. 6 as two "halves" 134a and 134b), through a cut-out region designated by the index numeral 124, in which the side piece is one overall side structure 134. Magneto assembly 170 is similarly placed within the "right" aluminum housing side piece 136, and appears in FIG. 6 as two "halves" 136a and 136b with a cut-out region 126 to locate magneto assembly 170. It will be understood that the position of the magnetos can also be mounted elsewhere, such as but not limited to, the top and bottom sides of the linear displacement device 130.

Magneto assemblies 150 and 170 are designed so that each of their outputs provides the short duration current pulse that is required for the operation of coils 102, 104, 112, and 114 as needed to operate linear displacement device 130. The specific design of the magnetos and their associated electrical circuits 160 and 180 will depend upon the configuration of linear displacement device 130, including the strength of the magnetic fields produced by permanent magnet 16 and 18 and induced in pole pieces 20, 22, 24, and 26, so that the appropriate current and pulse period is developed for the proper operation of displacement device 130. Magneto assembly 150 includes two output electrical terminals 162 and 164, and magneto assembly 170 includes two electrical output terminals 182 and 184. Terminals 162 and 164 are connected to the input and return terminals 106 and 108, and terminals 182 and 184 are connected to the input and return terminals 116 and 118, as depicted in FIG. 7, which provides an overall schematic and block diagram describing the electrical connections and operations of linear displacement device 130.

FIGS. 7A and 7B depict a combined schematic and block diagram of the electrical circuits used with magneto assemblies 150 and 170. As can be seen in these figures, it is preferred to have two parallel magneto circuits that are tied directly into the two electric circuits 100 and 110, that are also wired in parallel. To initiate the movement of piston 80, an external input pulse is required, at the location depicted by the terminals 190 and 192 on FIG. 7A. The external pulse input power is required for only a few milliseconds for the first pulse, and once the electromagnetic circuits are systematically energized, movable piston 80 will continue to operate using the input power that subsequently is generated by magneto assemblies 150 and 170. A short circuit or grounding switch is required in order to halt the movement of piston 80, as shown in FIGS. 7A and 7B by two contacts 210 and 212 of a double pole double throw (DPDT) "Stop" switch.

Magneto assemblies 150 and 170 are preferably wired in parallel and are configured so that they both yield the same polarity for a given displacement of piston 80. Each magneto assembly 150 and 170 is comprised of two circuits: (1) a field coil/pulse charge generator, and (2) a timing capacitor/ energy storage circuit. The parallel connections between magneto circuits 150 and 170 are depicted by the wires 194 and 196. The output of the pulse charge generator for magneto assembly 150 is depicted as occurring on wires 162 and 164, which are connected into the timing capacitor/ energy storage circuit (i.e. electrical circuit 160). For magneto assembly 170, its pulse charge generator output occurs along wires 182 and 184, which are connected into its timing capacitor/energy storage circuit, (i.e., electric circuit 180).

FIG. 7A depicts the direction of the current flow throughout the electric circuits of the entire displacement device 130 during a "Time Sequence 1" interval (referred to as "T1"), during which time the timing capacitor/energy storage circuit 160 releases a pulse of current along wire 200, through diode D1, and finally into the input terminal 106 and return terminal 118 of electrical circuits 100 and 110, respectively. This current pulse dissipates its energy in circuits 100 and 110 and returns along wire 202 back into electrical circuit 160. When this current pulse during interval T1 occurs, piston 80 is attracted to pole pieces 20 and 22, as depicted in FIG. 2. The current supplied by timing capacitor/energy storage circuit 160 can originate at the external input (i.e. terminals 190 and 192), or from the magnetos along wires 162 and 164, or it can come from both simultaneously. In any case, the magneto's timing capacitor/energy storage circuit 160 will automatically fix the frequency of operation of linear displacement device 130. It will be understood that an external input applied to terminals 190 and 192 and having a positive polarity at terminal 190 will initiate the motion of movable piston 80 from either its bottomed position (as shown in FIG. 3) or from an intermediate position (as shown in FIG. 1), however, to initiate the motion of piston 80 when it is resting in its upper position (as shown in FIG. 2), the external input must have the reverse polarity (i.e., a positive polarity at terminal 192). Since the input current supplied provides a uniformly repeating reversing polarity, the current pulse that causes piston 80 to move from its upper position is provided on the second input pulse that occurs at terminals 190 and 192.

To initiate operation, the current pulse received from the external source at terminals 190 and 192 travels to timing capacitor/energy storage circuit 160 where it is then stored for subsequent release to the electrical circuits 100 and 110. As the capacitor times out, a current pulse is released along wire 200 and through diode D1 so that it can flow into these two electrical circuits, as described above. As the coils 102, 104, 112, and 114 are appropriately energized, the magnetic circuit paths of the flux produced by permanent magnets 16 and 18 will shift to the path of least resistance, and the piston 80 will be attracted toward the pole pieces 20 and 22. As piston 80 travels through its displacement from pole pieces 24 and 26 toward pole pieces 20 and 22, a charge is generated in the magneto assemblies 150 and 170 due to the relative movement between permanent magnets 152 and 172 and pole pieces 158 and 178 along with field coils 156 and 176. This charge is then placed into the timing capacitor/energy storage circuit 180, to be used for subsequent purposes.

After this piston movement has occurred, the operation of linear displacement device 130 enters into a second time interval, "Time Sequence 2" (i.e., "T2"). As interval T2 begins, the energy associated with the current pulse from the magnetos described in the above paragraph that is contained in the timing capacitor/energy storage circuit 180 is released into the circuitry of linear displacement device 130 at wire 204. The current travels through diode D2, and enters input terminal 116 and return terminal 108 of electrical circuits 110 and 100, respectively. The return path for this current is along wire 206, and the current path directions during interval T2 are provided by the arrows as depicted in FIG. 7B. This released energy causes a tractive force to be generated in the pole faces of pole pieces 24 and 26, causes the causes the loss of tractive force in the pole faces of pol causing the displacement of piston 80 from the upper half-assembly 12 to the lower half-assembly 14. As a result of this displacement of piston 80, a charge is developed in magneto assemblies 150 and 170 having the opposite polarity to the charge that was induced by the displacement of piston 80 in the opposite direction during interval T1. This charge occurring during interval T2 is placed into the timing capacitor/energy storage circuit 160 for subsequent use in the following cycle, or until a force on movable piston 80 exceeds the combined capability of the magnetic circuit spring assemblies, or until the cycling is stopped by the application of the Stop switch (i.e., first and second contacts 210 and 212).

It will be understood that the magneto assemblies must provide the current pulses with the proper polarity so that each current pulse can be synchronized, stored, and later released into the electrical circuit. The current pulse is first generated by the magneto circuit, then stored and subsequently released into the electrical circuits 100 and 110 to enhance the net permeability of one magnetic circuit and to simultaneously cause an increase in the reluctance in the opposite magnetic circuit. The net result of the use of the magneto assemblies and circuits is to cause the displacement of piston 80, which will continue in a self-sustaining manner until the Stop switch is used. The diodes D1 and D2 are used to direct the pulse currents so that only the proper polarity occurs to cause the desired current to flow to and from a given timing capacitor/energy storage circuit.

The incorporation of the magneto circuits as described hereinabove automatically provides the reversing polarity for the current that is required for the operation of electrical circuits 100 and 110. In addition, the pulse current required can be provided by one or more magneto circuits wired in parallel, as there is ample force available as stored energy in the compression springs 62 and 72 to drive one or more magneto circuits. In addition, only one current pulse of a given polarity is operative in the circuitry at any given instant of time.

Based on the above design, displacement device 130 can be self sustaining and would only require external power sufficient to start the first displacement stroke of the movable piston. The current pulse generated by the magneto during this displacement will subsequently be released to be electromagnetic circuit in accordance with the trigger release circuit that determines the time-constant for the next displacement stroke. The duty cycle for the pulse circuit (including the external input circuit), and the work cycle is presented in FIG. 8. If a magneto cycle is employed in the device, it would replace the external input cycle after the first displacement stroke is completed.

Another point of importance lies in the fact that there would be a sizable improvement in the overall efficiency of displacement device 130 if the magneto circuit was considered, because the magnetic circuit utilizes only a small portion of the excess energy available in the compression springs to operate. Obviously, the advantage to incorporating a magneto or magnetos into the design is to make the device totally self-sustaining and only a single starting pulse of electrical power input is required to initiate the self-sustaining operation. If piston 80 is in its uppermost position at the start-up point, a second starting pulse of electrical power input having the opposite polarity is required for a self-sustaining operation.

Figure 8:
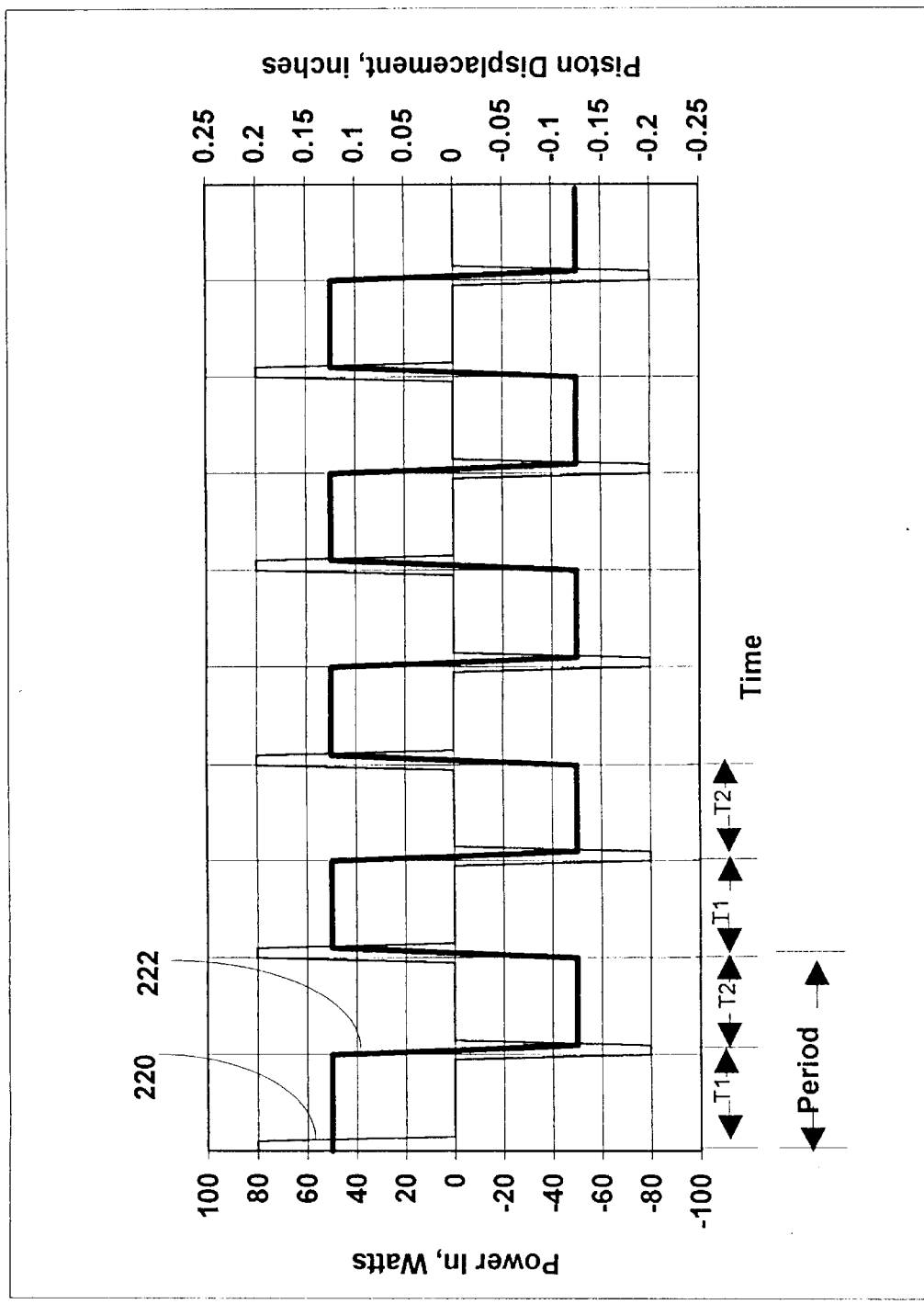
FIG. 8 is a graph of the electrical power vs. time and the piston displacement vs. time characteristics of the magnetically-powered linear displacement device depicted in FIG. 6.

In FIG. 8, the curve depicted by the index numeral 220 shows the electrical power pulse magnitude, with respect to time, required to drive the electrical circuits 100 and 110. The curve depicted by the index numeral 222 shows the displacement of piston 80 as a result of the current pulses, with respect to time. Indicators of the time intervals T1 and T2 are also provided to show the synchronization of the current pulses versus the piston displacement. The preferred time period of each of the current pulses is between 20 to 50 milliseconds, giving an operating frequency of 10 to 50 Hertz. If an operating frequency greater than 50 Hertz is desired, then laminated materials preferably would be used for all the soft magnetic portions of the linear displacement device 130.

Figure 9:
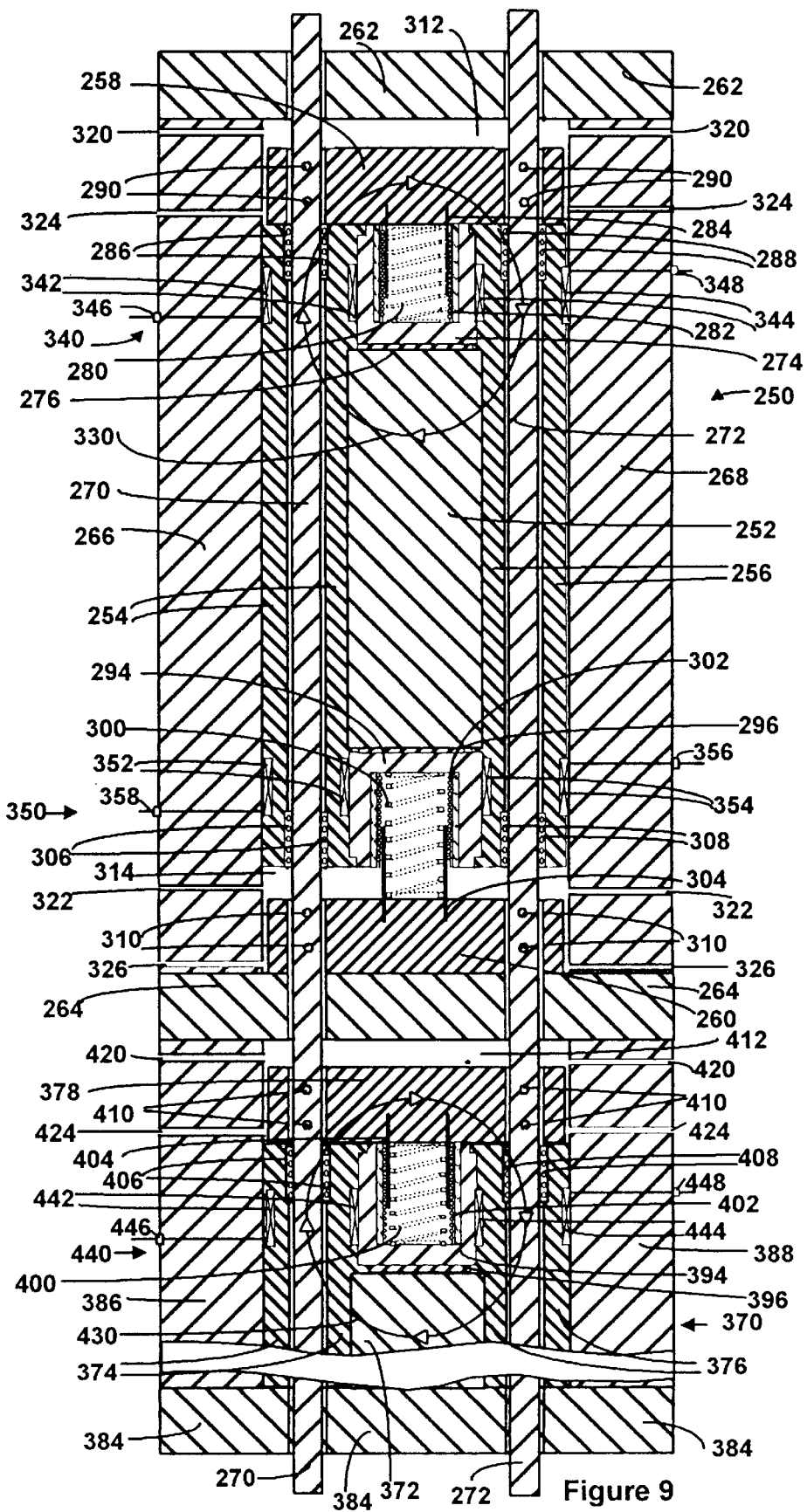
FIG. 9 is a top plan view in cross-section of another embodiment of a magnetically-powered linear displacement device having two movable end armatures and constructed according to the principles of the present invention, depicting the movable armatures in their "downward" positions.

FIG. 9 depicts a third embodiment of a magnetically-powered linear displacement device generally designated by the index numeral 250, in a cut-away cross-section view essentially down the centerline of the device in which the end armatures 258 and 260 are both movable. Displacement device 250 includes a permanent magnet 252 and a pair of pole pieces 254 and 256 which are positioned along the sides of permanent magnet 252. Each of the armatures is preferably connected to a compression spring 280 or 300, in a similar manner to that depicted in FIG. 1 by linear displacement device 10, however, in displacement device 250, there is only one spring attached per movable armature.

Similar to the above embodiments, permanent magnet 252 is preferably made of a very high strength permanent magnetic material creating a high flux density, such as the neodymium iron boron material known as CRUMAX 4014™. Pole pieces 254 and 256 are preferably made of a magnetically "soft" material that exhibits no substantial magnetic retentivity while additionally exhibiting a high magnetic flux density capability, such as a 1010 steel.

Linear displacement device 250 is preferably encased by an aluminum housing, consisting in FIG. 9 of an upper end piece 262, a lower end piece 264, a "left" side piece 266, and a "right" side piece 268. Although the preferred material is aluminum for these housing pieces, they can be made of any non-magnetic material. As described above, the primary purpose of this non-magnetic housing is to prevent magnetic cross-talk from interfering with the operation of linear displacement device 250 and other adjacent similar linear displacement devices, such as linear displacement device 370.

The upper armature 258 is not held in place as in the embodiment illustrated in FIG. 1 for displacement device 10, but is instead movable. Since both end armatures 258 and 260 are movable, it is preferred that their movements be synchronized and mechanically linked together by some type of non-magnetic (e.g., aluminum) tie-rod or tie-tube, illustrated in FIGS. 9 and 10 as tie-rods 270 and 272. Armatures 258 and 260 are preferably attached to tie-rods 270 and 272 by the use of set screws that impinge at the locations given by the index numerals 290 and 310, respectively. Both armatures 258 and 260 are preferably made of the same 1010 steel as is used to construct pole pieces 254 and 256.

Permanent magnetic 252 is attached to slots that are machined in pole pieces 254 and 256, so that the sides of magnet 252 are preferably touching the sides of these pole pieces. The opposite sides of pole pieces 254 and 256 are preferably touching the sides of the aluminum housing side pieces 266 and 268. While FIG. 9 depicts magnets, pole pieces, and housing pieces that are rectangular or square in configuration, it will be understood that rounded, cylindrically-shaped pieces could also be utilized to make up linear displacement device 250, in which the rounded sides of the various components would be in contact with the opposite mating rounded sides of the other adjacent components.

Tie-rods 270 and 272 are preferably run through machined slots or through-holes within the pole pieces 254 and 256. In the illustrated embodiment of FIG. 9, a series of bearings is used to allow the tie-rods to easily displace within the pole pieces, which also act as guides for the multiple movable armatures in displacement device 250. Tie-rod 270 utilizes a linear bearing 286 at the "top" portion of pole piece 254, and a linear bearing 306 at the "bottom" portion of pole pieces 254. In a similar manner, tie-rod 272 utilizes linear bearings 288 and 308 mounted within pole piece 256.

A base support and spring assembly block, preferably made of aluminum and designated by the index numeral 274, is mounted adjacent to the "top" end of permanent magnet 252, and is held in place by a machined slot in pole pieces 254 and 256. A filler layer of epoxy material is positioned at the location designated by the index numeral 276. A similar aluminum base support and spring assembly block 294 is mounted to the "bottom" end of permanent magnet 252, and is also held in place by machine slots in the pole pieces. A filler material consisting of epoxy is positioned at the location designated by the index numeral 296. The epoxy materials described above are preferably thermally conductive, and a suitable epoxy is DEVCON ALUMINUM PUTTY EPOXY™, manufactured by Devcon and available at all major industrial supply houses.

A linear ball bushing assembly, designated by the index numeral 282, is press fit into the base support and spring assembly block 274. Linear ball bushing assembly 282 is preferably made of aluminum or some other non-magnetic material. Linear ball bushing assembly 282 is designed to receive and allow linear movement of a hollow, cylindrical projection 284 that acts as a guide tube and fits around the outer surfaces of a non-magnetic compression spring, designated by the index numeral 280. A similar linear ball bushing assembly 302 is affixed to base support and spring assembly block 294. The linear movement of another hollow cylindrical projection 304 that acts as a guide tube for movable armature 260, is accommodated the insertion of cylinder 304 into the linear ball bushing assembly. Cylinder 304 also fits around the outer surfaces of a non-magnetic compression spring 300.

Figure 10:
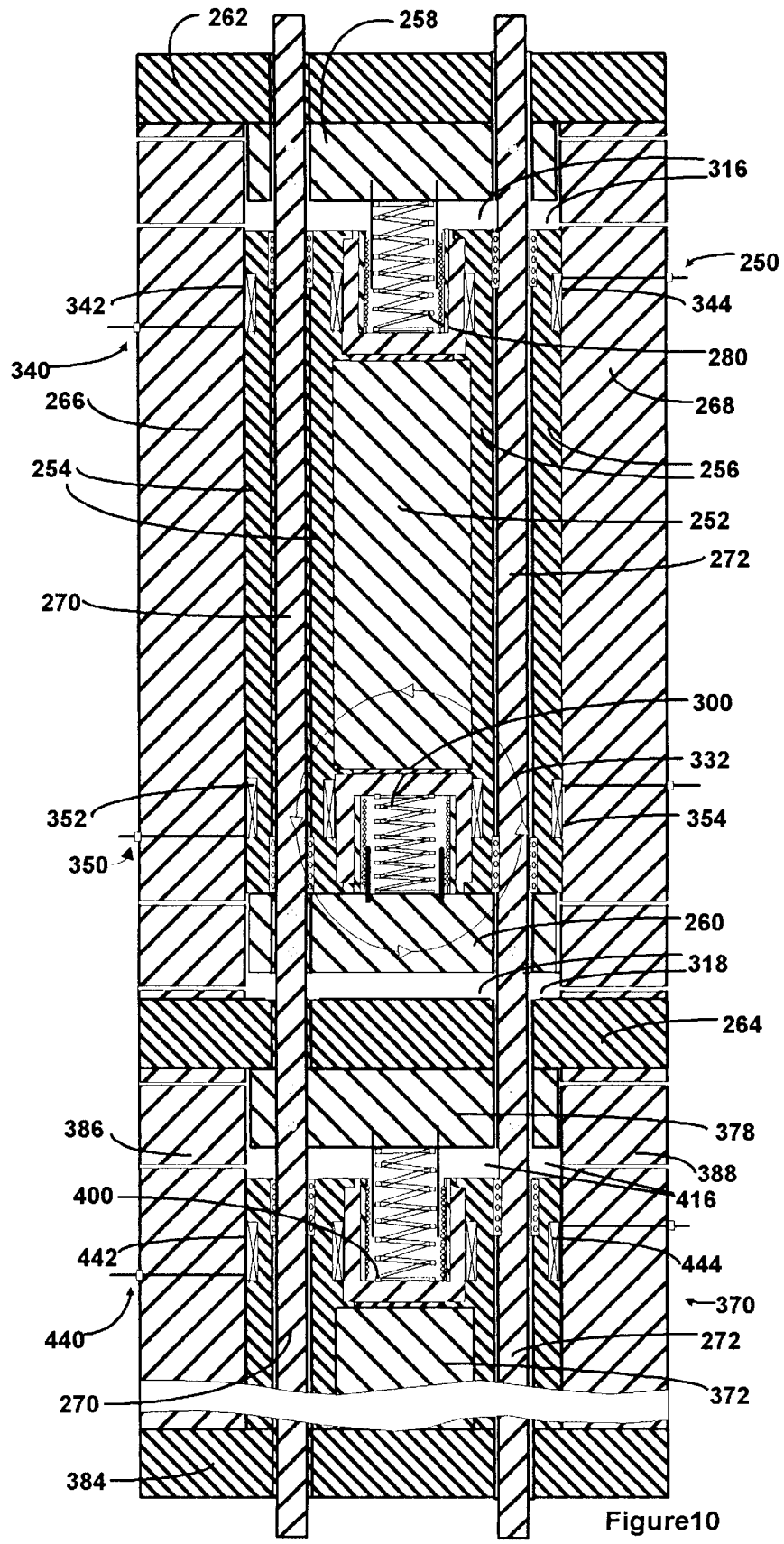
FIG. 10 is a top plan view and cross-section of the magnetically-powered linear displacement device depicted in FIG. 9 in which the movable armatures are positioned in their "upward" positions.

Guide tubes 284 and 304 are fabricated preferably from non-magnetic material and are mechanically connected to their respective movable armatures 258 and 260. These armatures preferably have a thickness sufficient to carry the maximum flux and the magnetic circuits, described hereinbelow. Guide tubes 284 and 304 confine the movements of movable armatures 258 and 260 to be linearly directed along the longitudinal axis of linear displacement device 250, which is depicted in FIG. 9 as an up-and-down motion. In FIG. 9, armature 258 is depicted in its "bottom" position and an air gap along its upper surface is located at the index numeral 312; movable armature 260 is depicted also in its "bottom" position and an air gap along its upper surface is located at the index numeral 314. In FIG. 10, armature 258 is depicted in its "upper" position and an air gap along its lower surface is located at the index numeral 316; a similar lower air gap can be seen at the index numeral 318 along the lower surface of movable armature 260, which is also in its "upper" position.

Since movable armatures 258 and 260 are preferably square or rectangular in shape, air gaps 312, 314, 316 and 318 are correspondingly square or rectangular in shape, while having the central portions of only air gaps 316 and 314 occupied by guide tubes 284 and 304 and linear ball bushing assemblies 282 and 302, respectively. Armatures 258 and 260 are preferably made of the same 1010 steel material as is used for the pole pieces, but can be manufactured from a material that can handle a higher level of flux density, thereby allowing the mass of the movable armatures to be decreased. Such a modification would also allow a higher frequency of operation due to the movable armatures' lower mass.

Permanent magnet 252 can create two parallel magnetic circuits designated by the index numerals 330 and 332, as best viewed in both FIGS. 9 and 10, respectively. Magnetic circuit 330 travels through permanent magnet 252, pole pieces 254 and 256, and through the "upper" movable armature 258. Magnetic circuit 332 also travels through permanent magnet 252 and pole pieces 254 and 256, and travels through the "lower" armature 260, rather than through the upper armature 258. Only one of these magnetic circuits will contain appreciable flux density at any given moment, and which magnetic circuit is presently active will depend upon the comparative reluctance of the two magnetic circuits 330 and 332 at any particular moment. The operation of these magnetic circuits will be described in detail hereinbelow.

Displacement device 250 contains an electrical circuit, generally designated by the index numeral 340 which travels through two mechanically separate windings or coils, designated by the index numerals 342 and 344. Coil 342 is wrapped around a recess within the outer walls of pole piece 254, and coil 344 is wrapped around a similar recess within the outer walls of pole piece 256. Whereas coils 342 and 344 are mechanically separate, they are electrically common, in that the electric circuit 340 begins at an input terminal designated by the index numeral 346, continues to coil 342, then travels from the opposite side of coil 342 over to coil 344, by a wire that is not shown in FIG. 9. Electrical circuit 340 continues through coil 344, and is output at the opposite side of coil 344 as a return path, which is connected to a terminal designated by the index numeral 348.

It is important to note that coils 342 and 344 are preferably opposite in polarity, i.e., a current flowing from input terminal 346 to return path terminal 348 will set up an electromagnetic field and coil 342 having the vector direction from bottom-to-top in FIG. 9, however, the electromagnetic field induced by coil 344 will have a vector direction from top-to-bottom as viewed in FIG. 9. When this magnetic field direction occurs, the resultant reluctance of magnetic circuit 330 is decreased, and the flux density produced by permanent magnet 252 will flow along magnetic circuit 330 rather than magnetic circuit 332, thereby flowing through the upper armature 258 and attracting it toward pole pieces 254 and 256 until armature 258 contacts the ends of those pole pieces. Once that occurs, armature 258 cannot move any further in that direction, and compression spring 280 is fully compressed.

During the same time interval that armature 258 is attracted toward pole pieces 254 and 256 because of an appreciable flux density existing in magnetic circuit 330, a current pulse is directed through a second electrical circuit 350 which travels through two mechanically separate windings or coils, designated by the index numerals 352 and 354. Coil 352 is wrapped around a recess within the outer walls of pole piece 254, and coil 354 is wrapped around a similar recess within the outer walls of pole piece 256. In a similar manner to coils 342 and 344, coils 352 and 354 are mechanically separate, but are electrically common such that electrical circuit 350 begins at an input terminal designated by the index numeral 358, continues to coil 352, then further continues to the opposite side of that coil and over to coil 354 by a wire that is not shown in FIG. 9. Electrical circuit 350 then continues through coil 354 and is output at the opposite end of that coil as a return path, which is connected to a terminal designated by the index numeral 356.

Coils 252 and 254 are preferably opposite in polarity, and a current flowing from input terminal 358 to return path terminal 356 will set up an electromagnetic field in coil 352 having the vector direction from bottom-to-top in FIG. 9, however, the electromagnetic field induced by coil 354 will have a vector direction from top-to-bottom as viewed in FIG. 9. When this magnetic field direction occurs, the resultant reluctance of magnetic circuit 332 (see FIG. 10) is increased, and the flux density produced by a permanent magnet 352 is discouraged from flowing along magnetic circuit 332, and therefore flows through magnetic circuit 330 instead. Since this occurs, the "bottom" movable armature 260 has no appreciable flux density flowing through it, and is not attracted to the ends of pole pieces 254 and 256. Because of this circumstance, compression spring 300 tends to push bottom armature 260 away from those pole pieces, while at the same time the upper movable armature 258 is being attracted toward the upper ends of those pole pieces 254 and 256.

These actions preferably occur simultaneously, so that the two armatures 258 and 260 both move in a uniform manner, such that they are both moved to their downward or bottommost positions as viewed in FIG. 9, and are each independently urged in that direction as described above. In addition, since they are both attached to tie-rods 270 and 272, the action of one of armatures 258 and 260 will produce a force that will attempt to cause the other armature to move in the same direction. Since both armatures are being driven in a downward manner (as viewed in FIG. 9), they are reinforcing each other's actions although due to different types of forces. At the initial moment that a current pulse is applied to electrical circuits 340 and 350 in the polarities described above, compression spring 300 will be at its maximum stored potential energy position because it will be in its most compressed position (i.e., movable armature 260 will be in its "upper" position at that time), and the magnetic attraction due to magnetic circuit 330 suddenly becoming energized with flux density induced by permanent magnet 252 produces its weakest affect upon movable armature 258 because that armature is at its furthest distance from the ends of pole pieces 254 and 256. As armature 258 moves toward pole pieces 254 and 256, its magnetic attraction to those pole pieces increases greatly, in an exponential manner, while the spring force of compression spring 300 becomes weaker as armature 260 moves away from pole pieces 254 and 256.

If the current flow through electrical circuit 340 is reversed, i.e., the direction of current flows from return path terminal 348 to input terminal 346, then the electromagnetic field set up by coils 342 and 344 will be in the opposite directions, respectively, as described in the paragraphs above. When that occurs, the resultant reluctance of magnetic circuit 330 will increase, and the flux produced by permanent magnet 252 will flow through magnetic circuit 332 instead of magnetic circuit 330. At this point, the upper movable armature 258 is no longer attracted to pole pieces 254 and 256, and compression spring 280 tends to push that movable armature 258 away from these pole pieces, while flux now passes through the lower armature 260.

At the same time, a reverse polarity current pulse is induced into electrical circuit 350, which tends to decrease the resultant reluctance of magnetic circuit 332, thereby assisting in causing the flux density produced by permanent magnet 252 to travel through magnetic circuit 332 instead of magnetic circuit 330. When this occurs (since the flux density is now passing through the lower movable armature 260), armature 260 will be attracted to the lower ends of pole pieces 254 and 256, and compression spring 300 will be compressed by this upward motion of armature 260.

It is preferred that the electrical circuits 340 and 350 be connected in parallel, such that input terminal 346 is electrically connected to return terminal 356, and return terminal 348 is electrically connected to input terminal 358. When connected in this configuration, it can be easily discerned from the above description and FIGS. 9 and 10 that when magnetic circuit 330 is active, movable armature 258 is urged downward (as viewed in FIG. 9) by two factors: first, since magnetic circuit 330 presently has flux density flowing through it and includes upper armature 258 in its circuit path, movable armature 258 is attracted toward pole pieces 254 and 256; second, since magnetic circuit 332 is not active (i.e., it contains no appreciable flux density), compression spring 300 will act to urge the lower movable armature 260 in the downward direction, and tie-rods 270 and 272 will tend to pull down the upper armature 258 while the lower armature 260 is being pushed downward. This situation will occur if the polarity of the electrical circuit 340 is such that a positive voltage is connected to input terminal 346 (which is also connected to return terminal 356), and the negative side of that voltage is connected to return terminal 348 (which is also connected to input terminal 358).

If the voltage polarity is reversed, then the magnetic circuit path 332 becomes active (as viewed in FIG. 10), and movable armatures 258 and 260 are urged upward by two forces: first, since magnetic circuit 332 is now active, a magnetic flux travels through the lower movable armature 260 as part of magnetic circuit 332, and armature 260 is attracted toward pole pieces 254 and 256; second, since magnetic circuit 330 is not active, compression spring 280 tends to push the upper movable armature 258 in an upward direction.

If the current or voltage directions are periodically reversed in electrical circuits 340 and 350, movable armatures 258 and 260 will tend to be drawn upward, then downward, then upward, etc., in a repeatable fashion, thereby providing a linear reciprocating motion. This motion will continue so long as electrical circuits 340 and 350 continue to be alternately pulsed with opposite polarity pulses, which will tend to shift the flux density from one magnetic circuit to another, as described above. It will be understood that an alternating circuit sine wave could be used as the voltage or current provided into electrical circuits 340 and 350, however, the preferred waveform for these voltages or currents is a series of short time duration positive and negative pulses, similar to that provided by a square wave generator, but having a very low duty cycle.

The air gaps 312, 314, 316, and 318 will all preferably have some type of vent to atmosphere so as to prevent the formation of trapped gases. These vents should be large enough in size to allow air to travel in and out during each cycle of the armatures so as to prevent the pressurization of any gases within these air gaps. These vents are depicted on FIGS. 9 and 10 by index numerals 320, 322, 324 and 326, respectively for air gaps 312, 314, 316 and 318.

It will be understood that the air gaps 316 and 314 can be filled with a pressurized gas to replace the need for compression springs 280 and 300. In this instance, the vents to atmosphere 324 and 322, respectively, would not be required (nor desired).

FIGS. 9 and 10 also show a second, in-series displacement device generally designated by the index numeral 370 which is virtually identical in every way to displacement device 250. In FIGS. 9 and 10, only the upper portions of displacement device 370 are shown, but it can be easily seen that displacement device 370 utilizes a permanent magnet 372, pole pieces 374 and 376, and an "upper" movable armature 378, that are virtually identical to those similar components of displacement device 250. The other construction details of the second displacement device 370 include a lower aluminum housing 384, and left and right side pieces 386 and 388, respectively, also preferably made of aluminum. Other construction details are similar, such as the use of an aluminum base support and spring assembly block 394, a filler layer of epoxy 396, a compression spring 400, a linear ball bushing assembly 402, a hollow guide tube 404, and linear bearings 406 and 408. Movable armature 378 is held in place with respect to tie-rods 270 and 272 by set screws that impinge at the locations given by the index numeral 410. It is, of course, crucial that armature 378 be positioned correctly with respect to the present position of armatures 258 and 260 within displacement device 250. In other words, all of the armatures of all of the displacement devices that are connected to tie rods 270 and 272 must be positioned in a like manner (i.e., all pistons must be in the "down" position when at rest, or all pistons must be in the "up" position when at rest) to prevent the overall assembly from locking up upon energization of the respective electrical circuits.

As seen in FIG. 9, an air gap 412 exists along the top surface of movable armature 378 when that armature is in its "down" position, and as seen in FIG. 10, a similar but opposite air gap 416 exists along the bottom surface of armature 378 when it is in its "up" position. When the electrical circuit 440 is energized such that its "input" terminal 446 receives a positive polarity current pulse and its "return" terminal 448 receives a corresponding negative polarity, then the resultant reluctance of the pole pieces 374 and 376 is decreased, and the flux density induced by permanent magnet 372 will flow through magnetic circuit 430, which includes armature 378. When this occurs, armature 378 will be attracted toward the end of pole pieces 374 and 376, and will move downward until it bottoms out against the ends of those pole pieces, as depicted in FIG. 9. In this circumstance, electrical circuit 440 would be energizing its respective coils 442 and 444 so that the electromagnetic field produced by a coil 442 has a direction from bottom-to-top, and the electromagnetic field produced by coil 444 will have a direction from top-to-bottom.

In a similar manner to that described above, it is preferable that air vents to atmosphere be connected to each of the air gaps within the displacement device 370. Vents 420 and 424 are depicted on FIGS. 9 and 10 to be connected, respectively, to air gaps 412 and 416.

It will be understood that displacement devices 250 and 370 preferably are to have nearly identical dimensions with respect to their respective individual components. This is important for standardization of parts, so that each of the individual displacement devices produces approximately an equal amount of work when in operation. Of course, there may be situations in which it is better to have certain of the displacement devices producing more force or work than others, and consequently be constructed of different dimensions, however, the general case would be to have all the devices virtually identical in dimensions and in power output.

It is important to note that proper synchronization of the electrical current pulses should occur amongst each of the linear displacement devices such as displacement device 250 and 370. The current pulses should have virtually identical polarities, time durations, and voltage and current amplitudes so that each of the displacement devices tends to operate in the same direction at the same moments in time. For example, the polarity applied to electrical circuit 340 should be the same as the polarity applied to electrical circuit 440, so that linear displacement devices 250 and 370 both operate in the same direction at that same time. Since the movable armatures of all of the ganged displacement devices are connected to a common set of tie-rods 270 and 272, then it is obvious that all of the movable armatures must move at the same direction at the same time, and it would be counterproductive to have any of the associated electrical circuits energized at the improper time or with the improper polarity. One way of obtaining these current pulses is to place magnetos near the periphery of the movable armatures, as noted above, and each of these magnetos for each of the displacement devices could be wired in parallel to other similar magnetos, thereby providing an overall larger power current pulse to be used by the corresponding electrical circuits. Once the magnetos start producing electrical pulses, the synchronization of all of the ganged linear displacement devices attached to tie rods 270 and 272 would occur automatically.

It will be understood that more than one set of ganged linear displacement devices could be constructed into a larger overall assembly. In such a situation, several linear displacement devices could be attached to tie-rods 270 and 272 all working in one particular direction, and another parallel set of linear displacement devices could be ganged together on a different pair of tie-rods, and these devices could be working in the opposite direction, to eliminate substantially all of the inherent vibration induced by the motions of the movable armatures of all the linear displacement devices.

It will be understood that the end armatures of the outermost displacement devices of a particular assembly of such devices can be used to create reciprocating motion which can then be induced into most any type of mechanical apparatus. In addition, a plurality of similar linear displacement devices (i.e., such as displacement device 250) could be arranged in a radial fashion, to produce rotating motion. Furthermore, it will be understood that the more displacement devices that are ganged in series, the more linear force will be produced by the overall assembly, whereas the more such units or assemblies that are placed in parallel, the more displacement will be produced.

A few of the important characteristics of the third embodiment of the present invention are:

(1) For a given linear displacement device, the magnetic field exerts a strong force at one end while exerting almost no force at the other end.

(2) For a given displacement device, the magnetic poles can be switched from one end to the other end at will.

(3) Each of the magnetic circuits in a particular linear displacement device will "remember" the last direction of greatest pull.

(4) Each of the movable armatures are mechanically pushed as well as magnetically attracted (pulled) simultaneously during a given displacement stroke, and the mechanical push is due to the connection of the tie-rods to the opposite end armature that is being pushed by the decompression of its associated compression spring.

(5) Only a low level pulse-type current signal is necessary in order to cause the end armature movements described above.

(6) The use of magnetos and magneto circuits automatically provides a polarity-reversing type of current source to be made available for a self-sustaining operation of the displacement device.

(7) The displacement device can be easily miniaturized or magnified in size.

(8) Several displacement devices can be coupled in a parallel or series connection to increase their force or displacement output.

(9) The incorporation of a magneto to the displacement device yields effective output over input efficiencies approaching infinity.

(10) The dual end armatures of the displacement device yields an effective displacement that is doubled per stroke as compared to the first embodiment displacement device.

Another alternative embodiment, designated by the index numeral 460 (see FIG. 11) is one in which a second permanent magnet 253 is mounted adjacent to an additional, center pole piece 255, still within the aluminum housing 268. Center pole piece 255 becomes shared by both permanent magnets 252 and 253, and center pole piece 255 would preferably have a width (as seen on FIG. 11) approximately twice that of pole pieces 254 and 256, to handle the doubled flux density flowing therethrough.

In this arrangement, only one "upper" coil, designated by the index numeral 343 is required in electrical circuit 340, and coil 343 is wound around a groove in the sides of center pole piece 255. In a similar manner, only one "lower" coil, designated by the index numeral 353 is required in electrical circuit 350, and coil 353 wound around a second groove in the sides of center pole piece 255. An upper magnetic circuit 462 (which operates in a similar fashion to magnetic circuit 330) flows from both permanent magnets 252 and 253 into pole piece 255 and armature 258, then splits into two opposite directions within armature 258, the "left" (in FIG. 11) portion further traveling through pole piece 254, and the "right" portion further traveling through pole piece 256. Magnetic circuit 462 then continues back into permanent magnets 252 and 253. Coil 343 is energized to induce an electromagnetic field having a polarity from bottom-to-top (in FIG. 11), which decreases the resultant reluctance of pole piece 255 at coil 343's location. Coil 353 would simultaneously be energized to induce an electromagnetic field having a polarity from top-to-bottom to increase the resultant reluctance of pole piece 255 at coil 353's location. After coils 343 and 353 operate in this manner, the magnetic flux of magnets 252 and 253 will flow through magnetic circuit 462, and armature 258 will then be attracted to pole pieces 254, 255, and 256.

During the next current pulse (see FIG. 12), coils 343 and 353 will be energized with a current having opposite polarity, thereby reversing the directions of the above-noted electromagnetic fields, which increases the resultant reluctance of pole piece 255 at coil 343's location and decreases the resultant reluctance of pole piece 255 at coil 353's location. The magnetic flux path will now travel through magnetic circuit 464, and attract armature 260 to pole prices 254, 255, and 256. Magnetic circuit 464 operates in a similar fashion to magnetic circuit 332, and flows from both permanent magnets 252 and 253 into pole piece 255 and armature 260, then splits into two opposite directions within armature 260, the "left" (in FIG. 11) portion further traveling through pole piece 254, and the "right" portion further traveling through pole piece 256. Magnetic circuit 464 then continues back into permanent magnets 252 and 253.

The springs 280 and 300 of displacement device 460 will operate in the same manner as described for embodiment 250 (see FIGS. 9 and 10), but would preferably be mounted to the center pole piece 255 rather than to one of the magnets, although a larger spring could be positioned over a combination of the center pole piece 255 and permanent magnets 252 and 253. In this way, the springs will still be acting along the centerline of displacement device 460, so that the movement of armatures 258 and 260 will not tend to be unbalanced to one side or the other. Of course, two springs mounted one each to magnets 252 and 253 could be used, but they would preferably be closely matched in performance, and could cause later problems as they wear.

It will be understood that displacement device 460 is only a variation of the configuration of displacement device 250, using standard industry techniques to build stronger permanent magnet assemblies. Even more layers of permanent magnets and interior pole pieces can easily be added to create even larger and stronger displacement devices.

Figure 11:
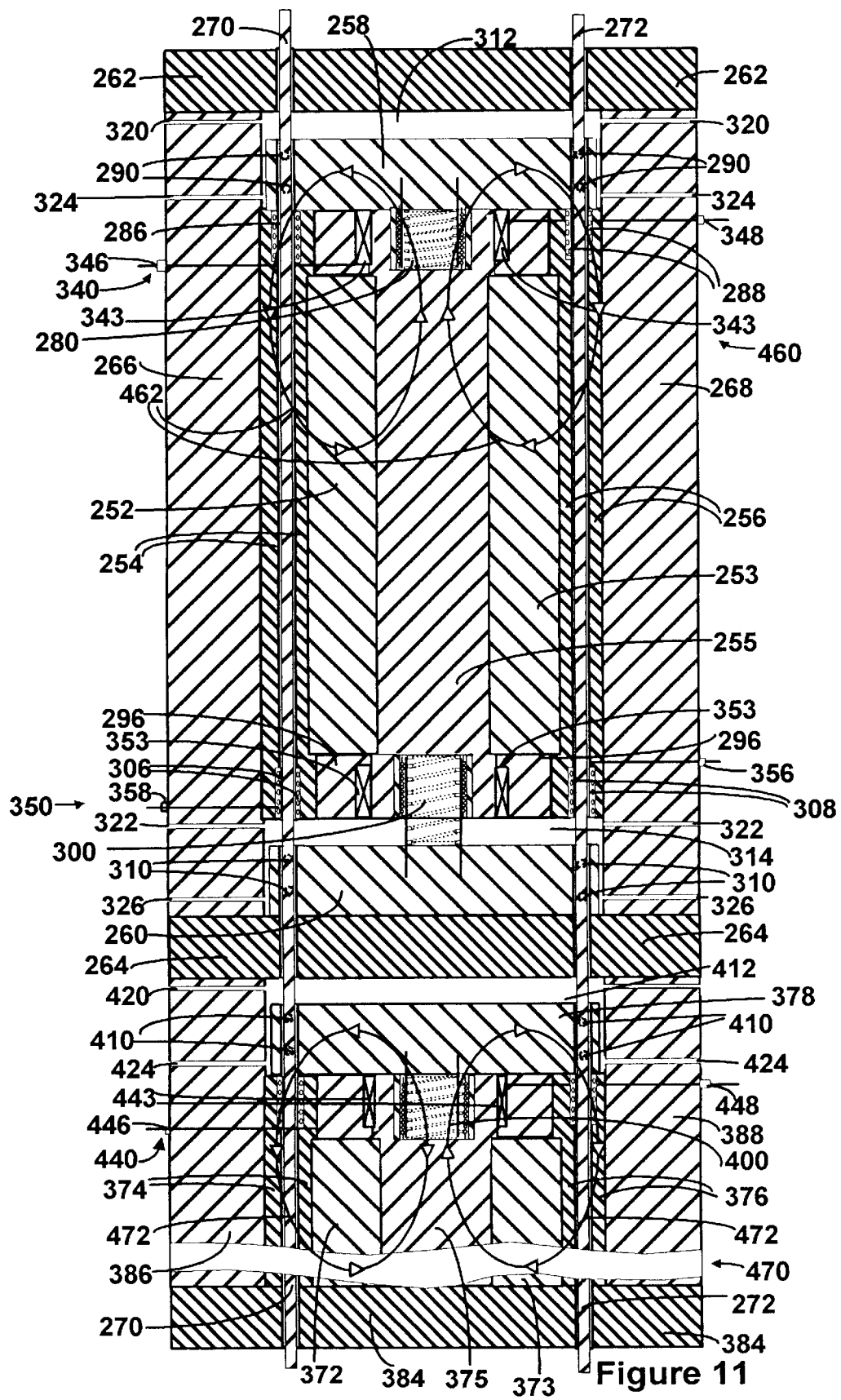
FIG. 11 is a top plan view in cross-section of yet another embodiment of a magnetically-powered linear displacement device having two movable end armatures, two permanent magnets, and a central pole piece with two smaller side pole pieces, and constructed according to the principles of the present invention, depicting the movable armatures in their "downward" positions.
Figure 12:
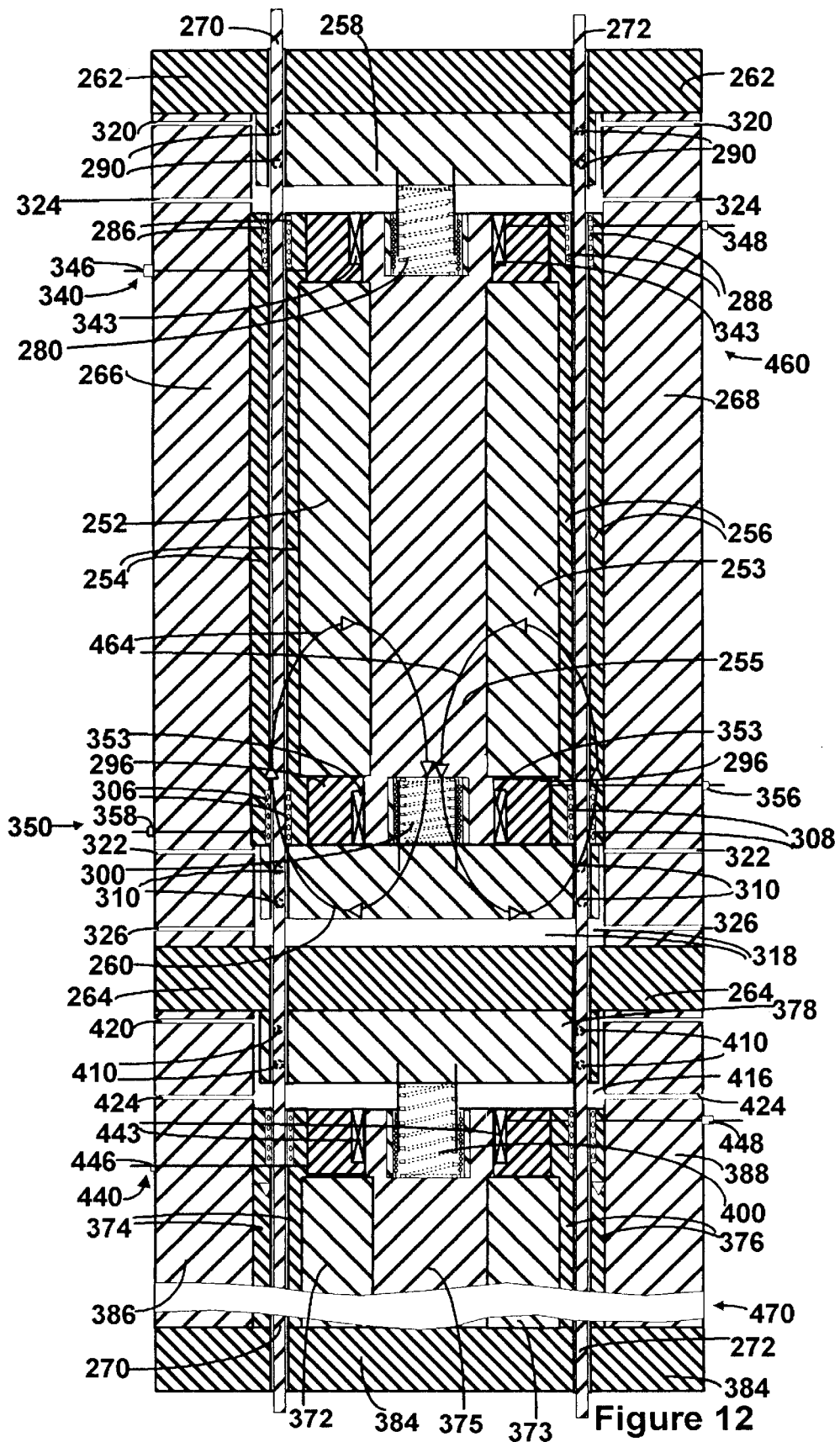
FIG. 12 is a top plan view and cross-section of the magnetically-powered linear displacement device depicted in FIG. 9 in which the movable armatures are positioned in their "upward" positions.

A second displacement device assembly 470 could be mounted in series with displacement device 460, as shown in FIGS. 11 and 12. Displacement device 470 similarly includes an additional (second) permanent magnet 373 and an additional (center) pole piece 375. Its "upper" electrical circuit 440 would only require a single coil 443 to initiate changes of flux density of the magnetic circuits, such as magnetic circuit 472.

It will be understood that it is not necessary that both armatures 258 and 260 be movable. One of these armatures could be fixed in relation to permanent magnet 252, and tie-rods 270 and 272 would be configured to pass therethrough (e.g., using a linear bearing—not shown).

It will be additionally understood that both armatures 258 and 260 can be held in fixed relationship to the aluminum housing, and magnets 252 and 253 plus all pole pieces 254, 255, and 256 (as one unitary structure) could instead be movable with respect to the housing and the armatures.

Figure 13:
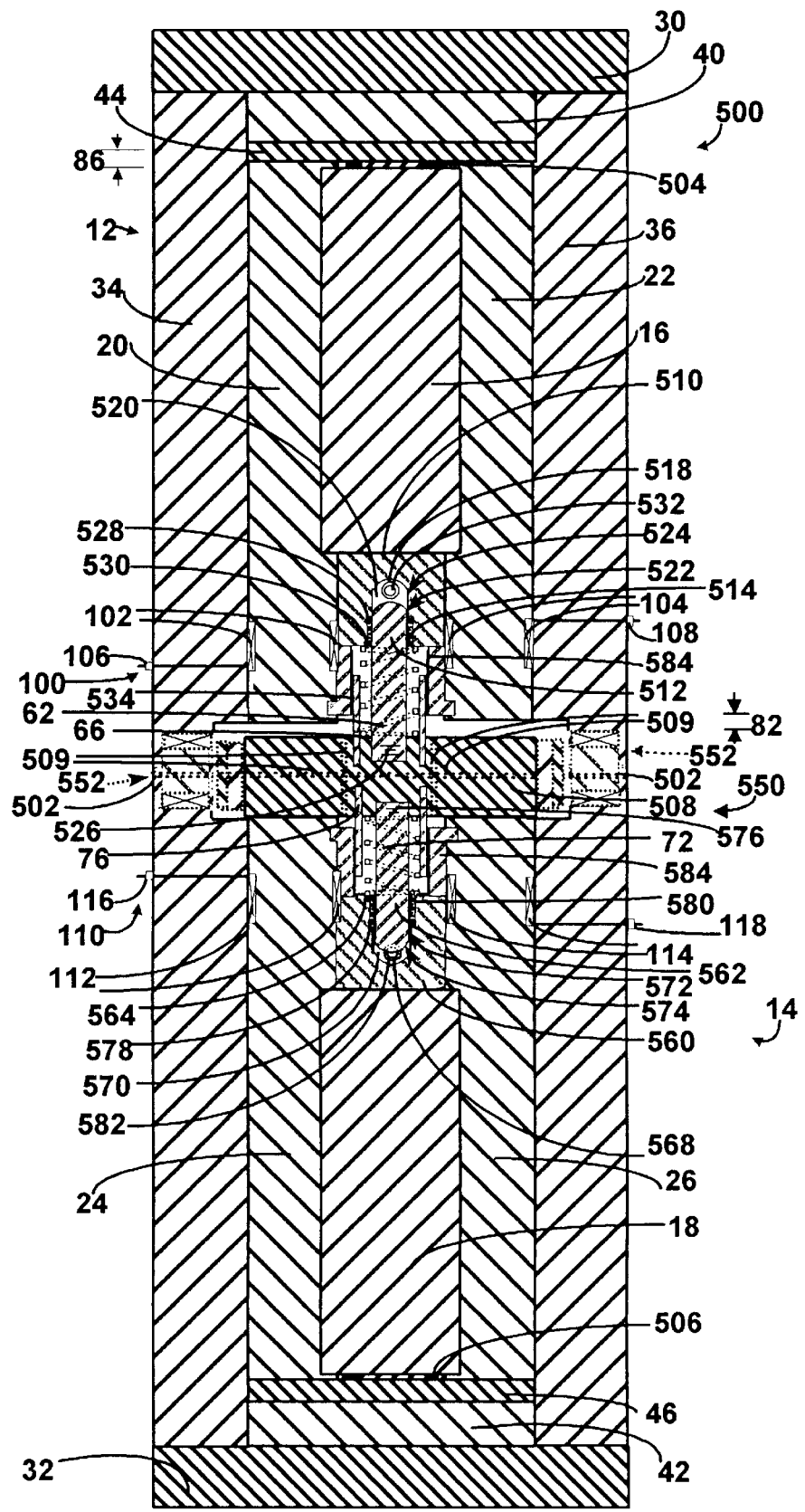
FIG. 13 is a top plan view in cross-section of a magnetically-powered linear displacement piston-driven pump constructed in accordance with the principles of the present invention.

Referring to FIG. 13, a high pressure, low volume magnetically-powered linear displacement pump, generally designated by the index numeral 500, is depicted in a cut-away cross-section view essentially down the centerline of the pump. Pump 500 is very similar to the magnetically-powered linear displacement device 10 described hereinabove, as can be easily seen by the like index numerals for most of the various components, and will operate in a similar manner. It is preferred that a small vent to atmosphere, designated by the index numeral 502 be located at the periphery of piston 508, as shown in FIG. 13.

Since pump 500 can vary in operating temperature resulting from the hydraulic fluid's temperature while it passes within the various chambers of pump 500, rather than having a layer of epoxy between permanent magnets 16 and 18 and their respective spacers 44 and 46, respectfully, it is preferred that a Belleville spring 504 be located between magnet 16 and spacer 44, and a similar Belleville spring 506 be located between magnet 18 and spacer 46. The use of these Belleville springs allows for a certain amount of expansion due to changes in operating temperatures of the components of pump 500. Piston 508 preferably incorporates a set of bleed holes 509 so as to allow any air pressure that may otherwise build up to be vented to atmosphere vent holes 502.

An oscillating pump sub-assembly, generally designated by the index numeral 550, is provided having two separate pump chambers and pistons, as described below. An upper piston 512 is located within a cylinder/manifold assembly block 510, and this assembly block 510 is preferably made of aluminum for low pressure applications or stainless steel for high pressure applications. Piston 512 is preferably made of aluminum, and its movements will be reciprocating in manner, just like that of magnetic piston 508. The movements of cylinder/manifold assembly block 510 are contained by a sleeve 514 which also is preferably made of aluminum. An "upper" (on FIG. 13) chamber 520 is located between a suction port 516 (see FIG. 14) and a discharge port 518, and normally is filled with a fluid, such as hydraulic oil, grease, water, a gaseous substance such as air, or liquid slurries, and the like. Piston 512 moves linearly along the centerline or longitudinal axis of magnetically-powered pump 500, and the location of piston 512's minimum travel within upper chamber 520 is designated by the arrow 522 and its maximum travel within that upper chamber is designated by the arrow 524. Piston 512 essentially includes its own "rod", which continues downward (in FIG. 13) toward the magnetic piston 508, and preferably is fastened into piston 508 via a set of threads 526.

To maintain proper boundaries of the fluid, a piston hydraulic seal 528 is located within piston 512, around its outer periphery, and a piston "rod" end seal 530 is located at the opposite end of the piston. Check valves 532 (see FIG. 14) are preferably included at both the suction and discharge sides of upper chamber 520.

A linear bearing 534 is provided to maintain the proper motions of the magnetic piston 508, and this linear bearing is preferably FRELON™ lined. Since the fluid passing through upper chamber 520 can become heated, particularly in a high-bypass mode because of a shearing action of the hydraulic fluid, it is preferred that some type of heat sink be utilized around the outer surfaces of magnetically-powered pump 500. This heat sink is preferably in the form of fins such as those depicted by the index numeral 536 (see FIG. 14). In the case of a gaseous fluid media, it is likely that, because of the heat of compression, such gaseous fluid would also be raised in temperature, thereby making it desirable to have the heat sink 536.

Figure 14:
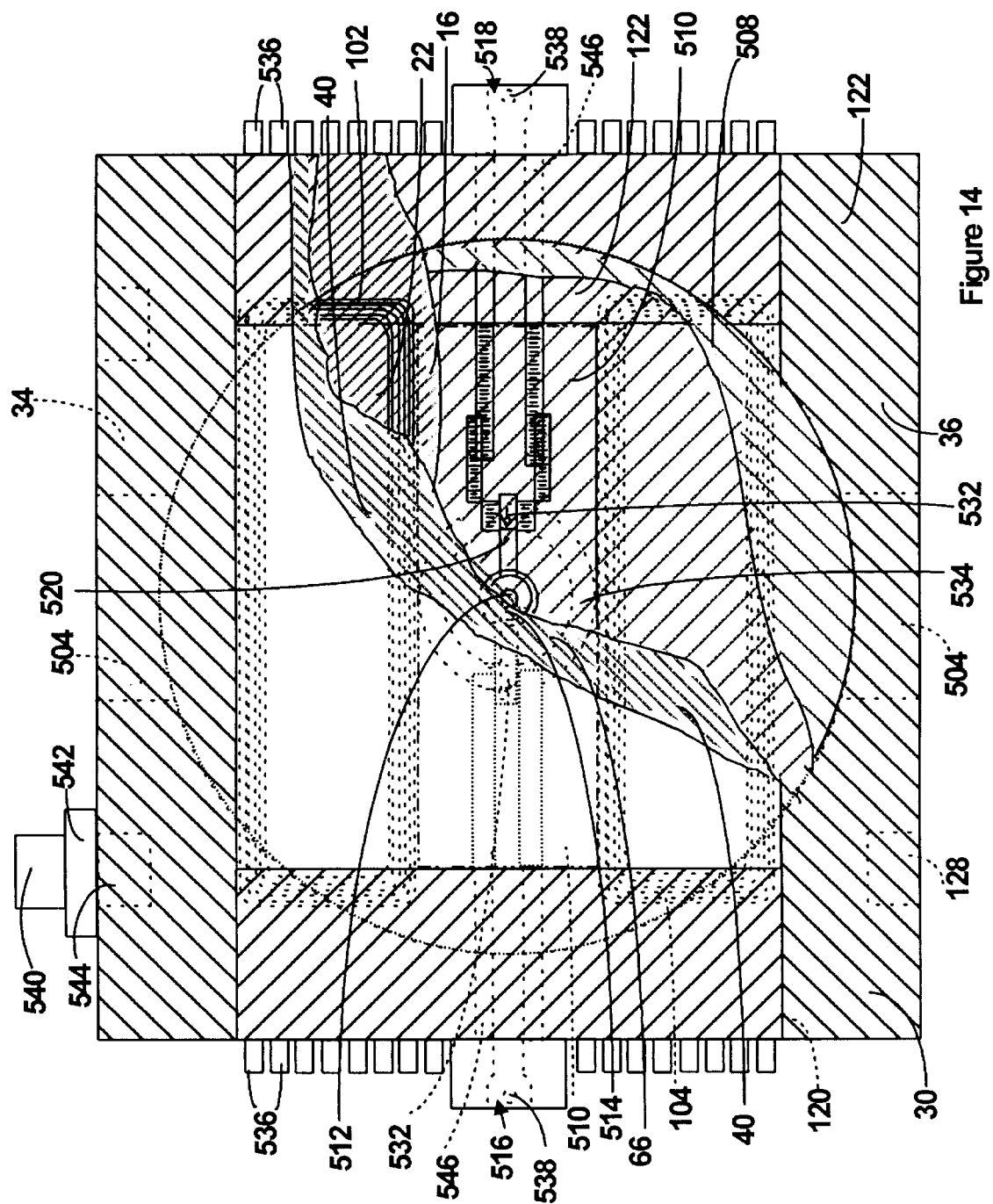
FIG. 14 is an end elevational view of the magnetically-powered pump depicted in FIG. 13.

In FIG. 14, the details of discharge port 518 are provided. Starting at the upper chamber 520, the fluid passes through check valve 532, and then enters into the interior spaces of a ball joint extension nipple designated by the index numeral 546. This ball joint extension nipple is part of a hydraulic quick connect/disconnect fitting 538. Such fittings and nipples are preferably threaded into tapped holes provided in the cylinder/manifold assembly block 510, and this is particularly important in high pressure applications.

As viewed in FIG. 14, it is preferred that some type of vibration mount be utilized with magnetically-powered pump 500. A rubber bushing 542 is provided having a rod 540 (preferably made of aluminum) bonded to this rubber bushing. Aluminum rod 540 is press fit at the index numeral 544 into the outer aluminum housing of magnetically-powered pump 500.

The remaining half of oscillating pump sub-assembly 550 comprises essentially a mirror image and includes a cylinder/manifold assembly block 560, a hydraulic piston 562, which moves inside a sleeve 564 and within a lower chamber 570. Lower chamber 570 has both suction and discharge ports, and on FIG. 13, the discharge port 568 is depicted. The location of minimum piston travel of piston 562 in lower chamber 570 is designated by the arrow 572 and the maximum such piston travel is designated by the arrow 574. Similarly as described above, piston 562 is preferable threaded into the magnetic piston 508 at threads 576. Piston 562 preferably has a hydraulic seal 578, and a piston "rod" end seal 580. Lower chamber 570 also would include check valves 582 at both its suction and discharge ports. The movements of magnetic piston 508 are also guided by a linear bearing 584.

It is preferred that both discharge port 518 and discharge port 568 be located on the same side of magnetically-powered pump 500, as depicted in FIG. 13. In this way, a discharge manifold can be located along that side of magnetically-powered pump 500, and a similar suction manifold can be located along its opposite side. It will be understood that various configurations of suction and discharge ports along with check valves and seals can be constructed without departing from the principles of the present invention.

The configuration depicted in FIGS. 13 and 14 show a preferred construction for a high-pressure low-volume pump. If it is desired to construct a lower pressure, yet higher volume pump, then it is preferred that the diameter of pistons 512 and 562 be increased along with the dimensions of the upper and lower chambers 520 and 570. It will be understood that various configurations of the hydraulic piston sizes as compared to the other dimensions of magnetically-powered pump 500, including the magnetic piston 508, can be constructed without departing from the principles of the present invention. It will also be understood that various configurations of permanent magnets and pole pieces can be constructed to create a magnetically-powered pump without departing from the principles of the present invention.

Magnetically-powered pump 500 can be further improved by the addition of one or more magnetos generally designated by the index numeral 552 on FIG. 13. In addition, other above embodiments of the magnetically-powered pump, disclosed hereinbelow, can similarly be improved by the addition of magnetos. The addition of these magnetos enables the magnetically-powered pumps to become self-sustaining in operation.

Figure 15:
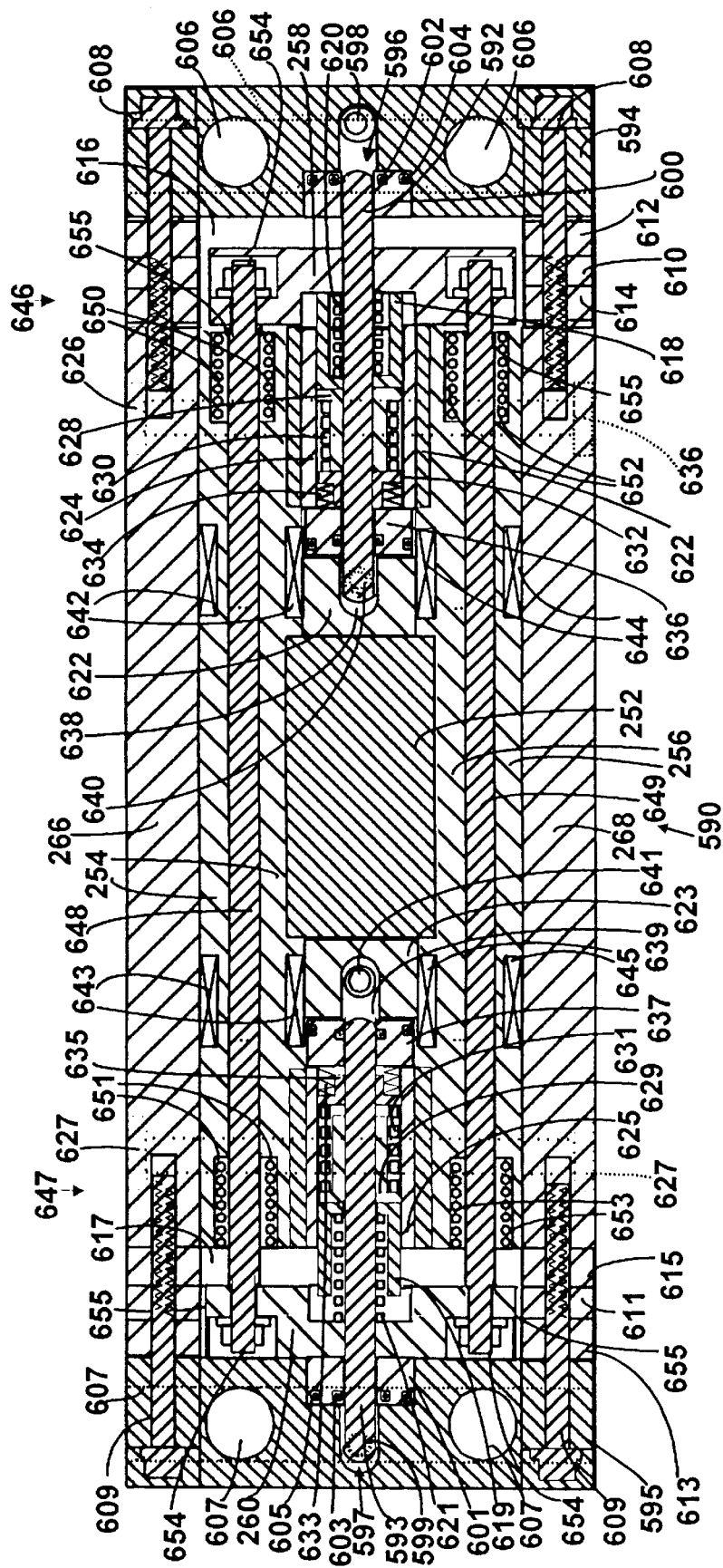
FIG. 15 is a top plan view in cross-section of a magnetically-powered pump having two movable end armatures and constructed in accordance with the principles of the present invention.

One variation of construction of magnets and pole pieces is provided in FIG. 15, which depicts a second embodiment of a magnetically-powered pump, generally designated by the index numeral 590. Magnetically-powered pump 590 has many similarities to the construction provided by FIG. 9 of a linear displacement device designated by the index numeral 250. For example, pump 590 includes a central magnet 252, a pair of pole pieces 254 and 256, two end armatures 258 and 260, and outer side walls 266 and 268. Other than these similarities, magnetically-powered pump 590 has major differences, particularly such as the addition of hydraulic chambers and pistons at both sides of each of the moveable armatures 258 and 260.

The "top" portion (as viewed in FIG. 15) of magnetically-powered pump 590 includes both a magnetic piston (i.e., armature 258) and a hydraulic piston, which are formed so as to be mechanically linked together by a hydraulic piston rod 592. A hydraulic cylinder cap 594 is located at the outer end of hydraulic piston rod 592, and contains a first pumping chamber 596. The first pumping chamber 596 is serviced by a suction port and a discharge port, designated by the index numeral 598 on FIG. 15, in which the two ports are opposite each other along a line that is perpendicular to the plane of FIG. 15. The upper end (on FIG. 15) of piston rod 592 acts as the hydraulic piston within the first pumping chamber 596. Piston rod 592 must be made of a non-magnetic material. A guide assembly 600 is used to retain and guide piston rod 592, and contains a hydraulic lip seal 602 (which preferably is rated at 5,000 psi) and an O-ring 604 which prevents hydraulic weepage. Guide assembly 600 is preferably press-fit into hydraulic cylinder cap 594. Lip seal 602 preferably is a U-cap polyseal.

Several mounting holes 606 are shown on FIG. 15, and countersunk tie-down bolts 608 are included at hydraulic cylinder cap 594. The tie-down bolts 608 can be removed for easy access to the interior portions of pump 590, and allow for easy replacement of the piston rod and other interior portions of the pump.

Armature 258 acts as a magnetic piston and has a central opening which is used to hold and position hydraulic piston rod 592 in a press-fit configuration. Attached to hydraulic cylinder cap 594 is an air inlet and exhaust sub-assembly generally designated by the index numeral 610 which includes multiple inlet/exhaust ports, as depicted by the index numerals 612 and 614, which are spaced around the outer surface of pump 590. Each of the ports 612 and 614 run entirely through the wall thickness of the air inlet and exhaust sub-assembly 610, thereby allowing the passage of air in and out of an air gap designated by the index numeral 616. Air gap 616 ultimately expands and contracts in size as the magnetic piston (or armature) 258 reciprocates within pump 590.

Armature 258 includes a recess to allow longitudinal movement of an external spring guide 618 which maintains a spring 620 in its proper position. Spring 620 preferably is a low force, high-deflection spring with respect to other springs within pump 590.

A hydraulic cylinder block, generally designated by the index numeral 622, is located within a recess in pole pieces 254 and 256, and preferably is made of 7075 high-strength aluminum. An outer bearing 624, preferably made of 841 oil impregnated bronze, is preferably press-fit into the hydraulic cylinder block 622. A 316 stainless steel through-nut and bolt combination, designated by the index numeral 626, is used to hold pole pieces 254 and 256 in proper orientation to hydraulic cylinder block 622 and outer bearing 624, as well as to pull the outer sidewall 266 and 268 together to maintain a single overall assembly.

Within the confines of the outer bearing 624 are two more springs and guides, including an internal spring guide 628 and a corresponding intermediate spring 630, which has characteristics that provide an intermediate force and deflection with respect to other springs within pump 590. Another internal spring guide 632 is located at a distance further from the hydraulic cylinder cap 594, and which retains a set of five Bellville springs, designated by the index numeral 634. Bellville springs 634 are low-deflection, high force springs with respect to the other springs within pump 590. The three springs 620, 630, and 634 each have a different spring rate, and their combination provides an overall effect of a variable-rate spring. The springs must be made of non-magnetic materials. All of the spring guides 618, 628, and 632 are preferably made of high strength 954 aluminum bronze.

Another guide assembly, designated by the index numeral 636, is located at the interior end of piston rod 592 and is virtually identical to the guide assembly 600, having the same hydraulic lip seal and O-ring. A second pumping chamber designated by the index numeral 638 is located at the interior end of hydraulic piston rod 592. A suction and discharge port 640 is used to introduce and to exit fluid that is being pumped within pump 590. The lower end (on FIG. 15) of piston acts as tacts as the hydraulic piston within the second pumping chamber 638.

The combination of mechanical travel restrictions within this portion of pump 590 is such that none of the springs 620, 630 or 634 are ever completely unloaded, and their overall extension is limited by the same mechanical constraints to yield a high fatigue resistance characteristic. The variable rate (i.e., non-linear rate) of this combination of springs takes advantage of the strong magnetic attraction between armature 258 and pole pieces 254 and 256 over and above which is being employed to overcome the necessary workload, and this magnetic attraction fully compresses the springs (within the design limits stated above) to take advantage of and to retain the maximum stored energy (within the springs) available from the characteristics of magnet 252. In addition, the non-linear spring rate characteristics allow for a low level of sound production caused by the movement of armatures 258 and 260 as they contact against their respective faces of the pole pieces 254 and 256. If low noise is critical to a particular design, then the spring constant of the Bellville springs 634 in combination with the other springs should be such that they exhibit a counter force that approaches that of the magnetic attraction between armature 258 and pole pieces 254 and 256, as that armature approaches the face of those pole pieces, minus the workload force. A slight disadvantage of obtaining such "silent running" is loss of a certain amount of displacement capability, thereby reducing the overall efficiency of and/or power produced by the magnetic and hydraulic components of pump 590.

To actuate the magnetic circuits (not shown on FIG. 15) of magnetically-powered pump 590, a set of electrical coils is used in identical manner as the coils 342 and 344 of FIG. 9. The coil designated by the index numeral 642 is preferably constructed having a polarity which is opposite that of the coil designated 644.

Using the preferred permanent magnet materials and preferred materials for the soft magnetic components (i.e., the pole pieces and armatures), magnetically-powered pump 590 can be utilized as a 3,000 psi hydraulic piston pump. The upper half of pump 590, described hereinabove, is generally designated by the index numeral 646, while a lower half of generally identical construction is designated by the index numeral 647, and is described immediately below.

The "bottom" portion (as viewed in FIG. 15) of magnetically-powered pump 590 includes both a magnetic piston (i.e., armature 260) and a hydraulic piston, which are formed so as to be mechanically linked together by hydraulic piston rod 593. A hydraulic cylinder cap 595 is located at the outer end of hydraulic piston rod 593, and contains a first pumping chamber 597. The first pumping chamber 597 is serviced by a suction port and a discharge port, designated by the index numeral 599 on FIG. 15, in which the two ports are opposite each other along a line that is perpendicular to the plane of FIG. 15. The upper end (on FIG. 15) of piston rod 593 acts as the hydraulic piston within the first pumping chamber 597. Piston rod 593 must be made of a non-magnetic material. A guide assembly 601 is used to retain and guide piston rod 593, and contains a hydraulic lip seal 603 (which preferably is rated at 5,000 psi) and an O-ring 605 which prevents hydraulic weepage. Guide assembly 601 is preferably press-fit into hydraulic cylinder cap 595. Lip seal 603 preferably is a U-cap polyseal.

Several mounting holes 607 are shown on FIG. 15, and countersunk tie-down bolts 609 are included at hydraulic cylinder cap 595. The tie-down bolts 609 can be removed for easy access to the interior portions of pump 590, and allow for easy replacement of the piston rod and other interior portions of the pump.

Armature 260 acts as a magnetic piston and has a central opening which is used for hydraulic piston rod 593 to be press-fit into armature 260. Attached to hydraulic cylinder cap 595 is an air inlet and exhaust sub-assembly generally designated by the index numeral 611 which includes multiple inlet/exhaust ports, as depicted by the index numerals 613 and 615, which are spaced around the outer surface of pump 590. Each of the ports 613 and 615 run entirely through the wall thickness of the air inlet and exhaust sub-assembly 611, thereby allowing the passage of air in and out of an air gap designated by the index numeral 617. Air gap 617 ultimately expands and contracts in size as the magnetic piston (or armature) 260 reciprocates within pump 590.

Armature 260 includes a recess to allow longitudinal movement of an external spring guide 619 which maintains a spring 621 in its proper position. Spring 621 preferably is a low force, high-deflection spring with respect to other springs within pump 590.

A hydraulic cylinder block, generally designated by the index numeral 623, is located within a recess in pole pieces 254 and 256, and preferably is made of 7075 high-strength aluminum. An outer bearing 625, preferably made of 841 oil impregnated bronze, is preferably press-fit into the hydraulic cylinder block 623. A 316 stainless steel through-nut and bolt combination, designated by the index numeral 627, is used to hold pole pieces 254 and 256 in proper orientation to hydraulic cylinder block 623 and outer bearing 625, as well as to pull the outer sidewall 266 and 268 together to maintain a single overall assembly.

Within the confines of the outer bearing 625 are two more springs and guides, including an internal spring guide 629 and a corresponding intermediate spring 631, which has characteristics that provide an intermediate force and deflection with respect to other springs within pump 590. Another internal spring guide 633 is located at a distance further from the hydraulic cylinder cap 595, and which retains a set of five Bellville springs, designated by the index numeral 635. Bellville springs 635 are low-deflection, high force springs with respect to the other springs within pump 590. The three springs 621, 631, and 635 each have a different spring rate, and their combination provides an overall effect of a variable-rate spring. The springs must be made of non-magnetic materials. All of the spring guides 619, 629, and 633 are preferably made of high strength 954 aluminum bronze.

A second guide assembly, designated by the index numeral 637, is located at the interior end of piston rod 593 and is virtually identical to the guide assembly 601, having the same hydraulic lip seal and O-ring. A second pumping chamber designated by the index numeral 639 is located at the interior end of hydraulic piston rod 593. A suction and discharge port 641 is used to introduce and to exit fluid that is being pumped within pump 590. The lower end (on FIG. 15) of piston rod 593 acts as the hydraulic piston within the second pumping chamber 639.

The combination of mechanical travel restrictions within this portion of pump 590 is such that none of the springs 621, 631 or 635 are ever completely unloaded, and their overall extension is limited by the same mechanical constraints to yield a high fatigue resistance characteristic. The variable rate (i.e., non-linear rate) of this combination of springs takes advantage of the strong magnetic attraction between armature 260 and pole pieces 254 and 256 over and above which is being employed to overcome the necessary workload, and this magnetic attraction fully compresses the springs (within the design limits stated above) to take advantage of and to retain the maximum stored energy (within the springs) available from the characteristics of magnet 252. In addition, the non-linear spring rate characteristics allow for a low level of sound production caused by the movement of armatures 258 and 260 as they contact against their respective faces of the pole pieces 254 and 256. If low noise is critical to a particular design, then the spring constant of the Bellville springs 635 in combination with the other springs should be such that they exhibit a counter force that approaches that of the magnetic attraction between armature 260 and pole pieces 254 and 256, as that armature approaches the face of those pole pieces, minus the workload force. As related above, the disadvantage of obtaining such "silent running" is loss of a certain amount of displacement capability, thereby reducing the overall efficiency of and/or power produced by the magnetic and hydraulic components of pump 590.

To actuate the magnetic circuits (not shown on FIG. 15) of magnetically-powered pump 590, a set of electrical coils is used in identical manner as the coils 342 and 344 of FIG. 9. The coil designated by the index numeral 643 is preferably constructed having a polarity which is opposite that of the coil designated 645.

To cause upper pump subassembly 646 to operate in unison with lower pump subassembly 647, a set of tie-rods 648 and 649 are utilized to force the armatures 258 and 260 to remain in their proper locations with respect to each other. Tie-rods 648 and 649 are aligned for slidable movement by a set of linear ball bushings 650, 651, 652, and 653. These ball bushings are self-aligning. Once the magnetic pistons (i.e., the armatures) are working in cooperation with one another, the hydraulic piston rods 592 and 593 will automatically work in cooperation with one another, thereby making all four pump chambers 596, 597, 638, and 639 to work in cooperation with one another. As depicted in FIG. 15, for each stroke of magnetically-powered pump 590, there will be two pump chambers undergoing fluid compression and subsequent displacement. For each cycle of magnetically-powered pump 590 there will be a total of four hydraulic pump chamber compression and displacement operations. For a given stroke, when two of the chambers are compressing and therefore displacing fluid, the other two pump chambers are causing suction of hydraulic fluid from their respective suction ports.

It will be understood that a set of check valves (not shown in FIG. 15) is used for each of the pumping chambers of magnetically-powered pump 590, in a similar manner to those depicted in FIG. 14. In other words, since there are four separate pumping chambers, there will be a total of eight check valves attached to the respective discharge and suction ports.

Tie-rods 648 and 649 have threaded ends and are put under tension by the use of a standard nut and washer assembly, designated in four places by the index numeral 654 on FIG. 15. These nuts and washers, as in the case of the tie-rods themselves, should be made of non-magnetic materials. Tie-rods 648 and 649 each have shoulders at both ends that meet the faces of the magnetic armatures 258 and 260, and their locations must be in the same plane to properly lock-up the tie-rods to the armatures. The location of these shoulders is depicted in FIG. 15 at four places by the index numeral 655.

Figure 16:
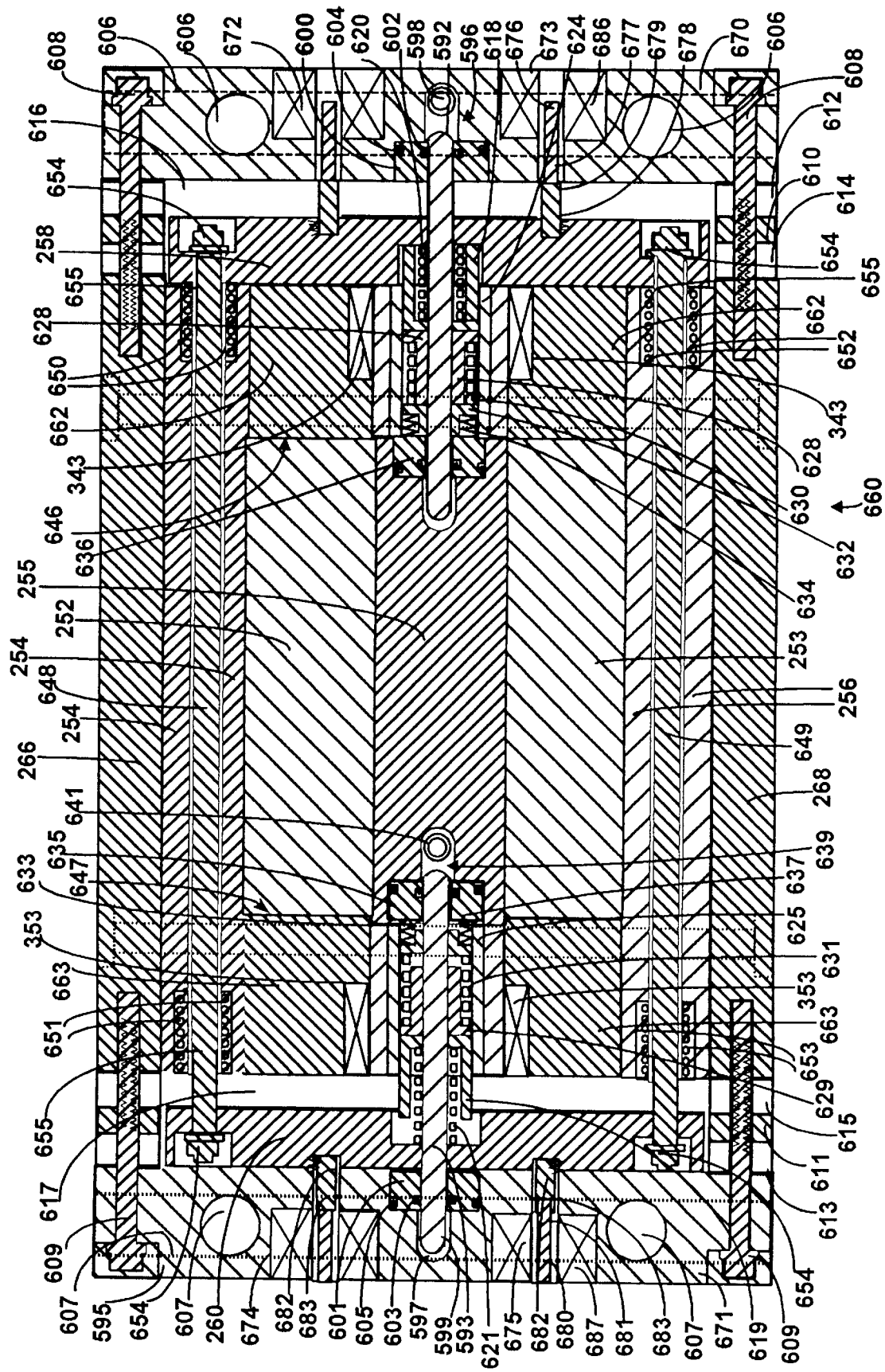
FIG. 16 is a top plan view in cross-section of a magnetically-powered pump having two movable end armatures and having two parallel permanent magnets, constructed in accordance with the principles of the present invention.

A third embodiment of a magnetically-powered pump is provided in FIG. 16, and is generally designated by the index numeral 660. Magnetically-powered pump 660 has many similar construction features as compared to the linear displacement device 460 depicted in FIG. 11, having two permanent magnets 252 and 253 along with a central pole piece 255 and two outer pole pieces 254 and 256. Oscillating pump sub-assemblies are added on both sides of each of the end armatures 260 and 258, along the central axis of magnetically-powered pump 660.

A set of electrical coils 343 and 353 are used to actuate the magnetic circuit paths (not shown on FIG. 16) in the same manner as described for linear displacement 460 in FIG. 11. When the armatures 258 and 260 act as magnetic pistons and displace with respect to the pole pieces 254, 255, and 256, they induce motion into the hydraulic piston rods 592 and 593, which preferably are press-fit into openings of armatures 258 and 260. These hydraulic piston rods form a portion of the upper pump sub-assembly 646 and lower pump sub-assembly 647, which are virtually identical to those pump sub-assemblies of the same index numerals depicted in FIG. 15. By using these pump sub-assemblies, magnetically-powered pump 660 will exhibit two suction and compression operations per stroke, thereby providing a total of four suction and compression operations per complete cycle. The spring rates can be identical for pump 660 as compared to pump 590, or they can be varied since pump 660 has two permanent magnets and can produce more power. The springs of magnetically-powered pump 660 would preferably still exhibit a non-linear variable rate so as to not exceed their fatigue-rated levels of extension and compression.

The upper and lower pump subassemblies 646 and 647 are embedded within the central pole piece 255, as shown on FIG. 16. Pole piece 255 in effect takes the place of hydraulic cylinder blocks 622 and 623, so outer bearings 624 and 625 preferably are press-fit into pole piece 255. In addition, guide assembly 636 and 637 preferably are press fit into the central pole piece 255. The area between the end of the permanent magnets 252 and 253 and their armatures 258 and 260, generally designated by the index numerals 662 and 663, is preferably filled with some type of thermal-conducting epoxy material. By use of this epoxy, the heat produced by electrical coils 343 and 353 is efficiently transferred away.

The hydraulic cylinder caps of magnetically-powered pump 660 are somewhat different in configuration than those of magnetically-powered pump 590 in that they contain an array of magnetos. These hydraulic cylinder caps are designated by the index numerals 670 and 671, and in the cross-sectional view of FIG. 16, two magnetos 672 and 673, and two magnetos 674 and 675, are located within these hydraulic cylinder caps.

The construction of magneto 673 comprises a magneto rod 676, which is made up of two halves-a permanent magnetic material portion 677 that reciprocates within and without an electrical coil 686, and an aluminum portion 678 that is attached to armature 258. These two rod halves 677 and 678 are joined by a fastening region 679 which preferably comprises a male portion of the magnet rod-half 677 that mates to a female portion of the aluminum rod-half 678. In a similar manner, magneto 675 utilizes a magneto rod 680, which comprises two halves 681 and 682, respectively, made of a magnetic material and an aluminum material and which are joined at a fastening region 683. The magnetic region 681 is designed to reciprocate within and without an electrical coil 687, and the aluminum region 682 is attached to armature 260.

As can be seen in FIG. 16, it is preferred that the top magnetos and the bottom magnetos operate in the opposite sense such that the permanent magnets of the "top" magnetos are, for any particular period of time, operating in the opposite polarity of the permanent magnets of the "bottom" magnetos. This is accomplished by arranging the magnets of the top magnetos to be traveling out of the coils 686 while the magnets of the lower magnetos are traveling into the coils 687. The connection of the outputs of these magnetos has been related hereinabove, and the array of magnetos are connected in either series or parallel depending upon the desired magnitude of voltage and current for utilization by magnetically-powered pump 660.

Figure 17:
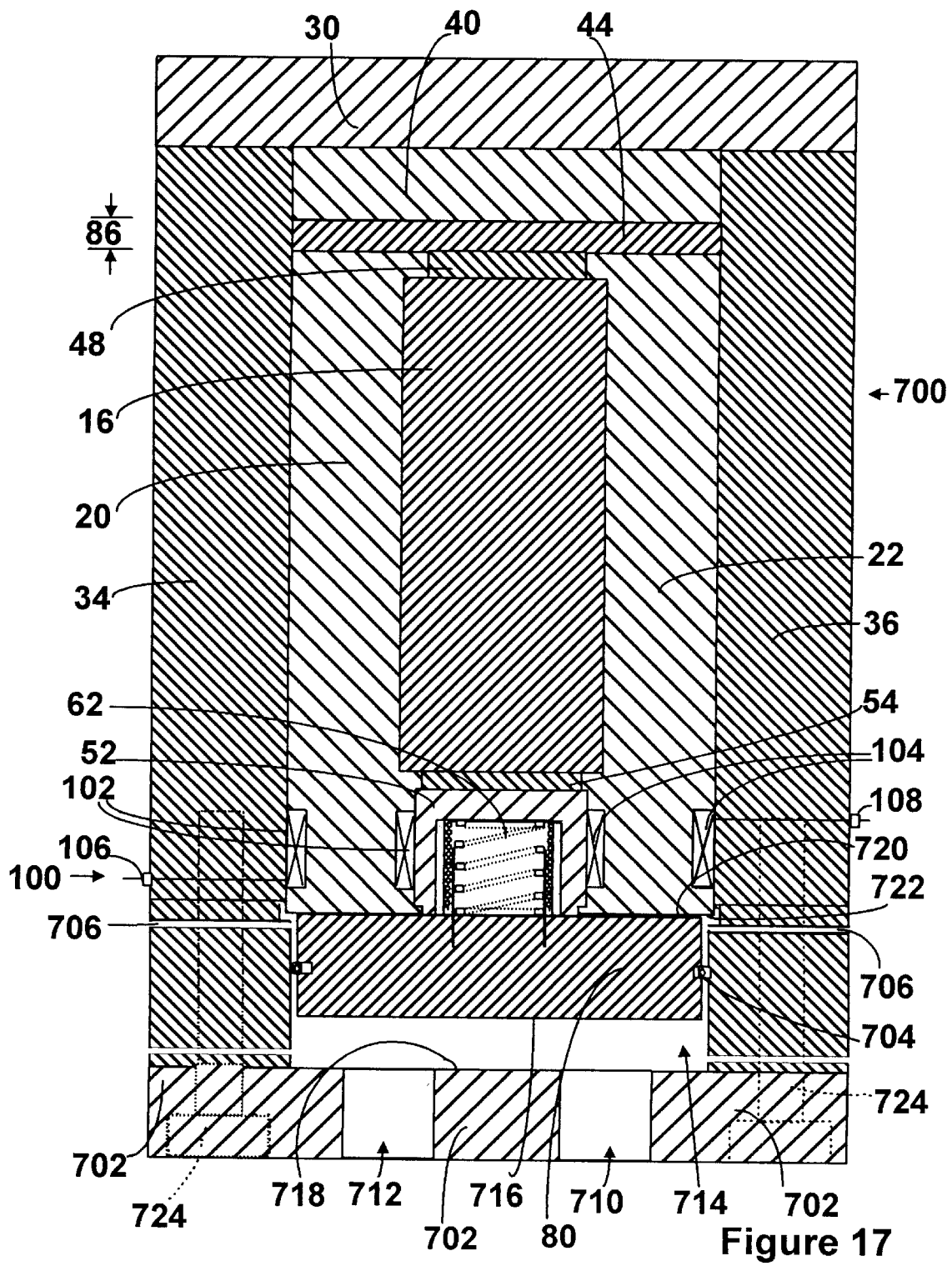
FIG. 17 is a side elevational view in cross-section of a magnetically-powered ON-OFF valve for low-pressure applications and constructed in accordance with the principles of the present invention.

Using the principles of the present invention, a magnetically-powered valve can be constructed, as depicted in FIG. 17 by the index numeral 700. The primary magnetic components of valve 700 are very similar to the upper components of the linear displacement device 10 depicted in FIG. 1, essentially those components included in the half-assembly 12. Using the same components, a valve body 702 can be permanently affixed to the housing side pieces 34 and 36 (as seen in FIG. 17), so that the movable piston 80 is now surrounded by a fluid chamber 714 having an inlet 710 and an outlet 712. An O-ring 704 is preferably located around the outer periphery of piston 80 to prevent any of the operating fluid chamber 714 from escaping towards the upper regions of piston 80.

It is preferred that a vent to atmosphere, designated by the index numeral 706, be included in the valve body 702 to prevent any gaseous substance from being trapped or accumulated in the upper regions of piston 80. To create a movement in movable piston 80, an electrical current pulse is directed into the electrical circuit 100 at terminals 106 and 108 to energize electromagnetic coils 102 and 104. As described in detail hereinabove, the current pulse (of a positive polarity at terminal 106) causes the resultant reluctance to be increased in pole pieces 20 and 22 near coils 102 and 104, and piston 80 will not be attracted to pole pieces 20 and 22. Compression spring 62 will push piston 80 away from these pole pieces until it stops at its most extended travel position. When this occurs, the bottom surface 716 of piston 80 will abut against the top surface 718 of valve body 702 within fluid chamber 704, thereby closing off any potential fluid path between inlet 710 and outlet 712. When this occurs, magnetically-powered valve 700 will essentially be in its "closed" position.

Once magnetically-powered valve 700 is in its closed position, it will stay in that position even though no current is flowing through electrical circuit 100. In order to move piston 80 to its opposite travel position, a current pulse of opposite polarity is introduced into electrical circuit 100 at terminals 106 and 108. This opposite polarity current pulse travels through coils 102 and 104 so as to decrease the resultant reluctance of pole pieces 20 and 22 at the locations of coils 102 and 104, thereby creating a magnetic attraction between pole pieces 20 and 22 and movable piston 80. When that occurs, piston 80 moves upward (in FIG. 17) until its top surface 720 abuts or nearly abuts the bottom surface 722 of pole pieces 20 and 22. When this occurs, a fluid path between inlets and outlets 710 and 712 is opened (as depicted in FIG. 17) within fluid chamber 714, and fluid may then easily flow. Magnetically-powered valve 700 is then in its "open" position. It will be understood that the fluid flowing through inlet 710, outlet 712, in fluid chamber 714 can be any type of gaseous or liquid substance, such as hydraulic oil, water, pressurized air, and the like.

In the illustrated embodiment of FIG. 17, magnetically-powered valve 700 is merely an "ON-OFF" valve, and operates in a rather simplistic manner in which there is only one inlet and outlet. It will be understood that many other configurations of inlets and outlets and spools can be added so that such spools move in conjunction with piston 80, thereby creating two-way, three-way, and other assorted types of valves. In addition, it will be understood that magnetically-powered valve 700 could be configured as a reverse-acting valve merely by moving the inlet and outlet to a position above the top surface 720 of movable piston 80, e.g., at the location of vents 706. Furthermore, it will be understood that magnetically-powered valve 700 could easily be made in a configuration having two permanent magnets, one above and one below the movable piston 80, similar to the construction of magnetically-powered pump 500 depicted in FIG. 13.

Magnetically-powered valve 700 is preferably used in a low-pressure, high-volume application, in which movable piston 80 is only working against a relatively low pressure fluid media. For use in high-pressure applications, a different configuration is preferred for the magnetically-powered valve, and an exemplary example is provided in FIG. 18A by the high pressure magnetically-powered ON-OFF valve designated by the index numeral 750. The primary magnetic components of valve 750 are virtually identical to those of valve 700, however, a different lower valve body designated by the index numeral 752 is provided. As can be easily seen in FIG. 18A, an inlet 760 and outlet 762 are provided along the sides of a movable piston 754, so that piston 754 is no longer acting against the pressure of the working fluid medium, and in which a high pressure will not detrimentally effect its operation.

Figure 18A:
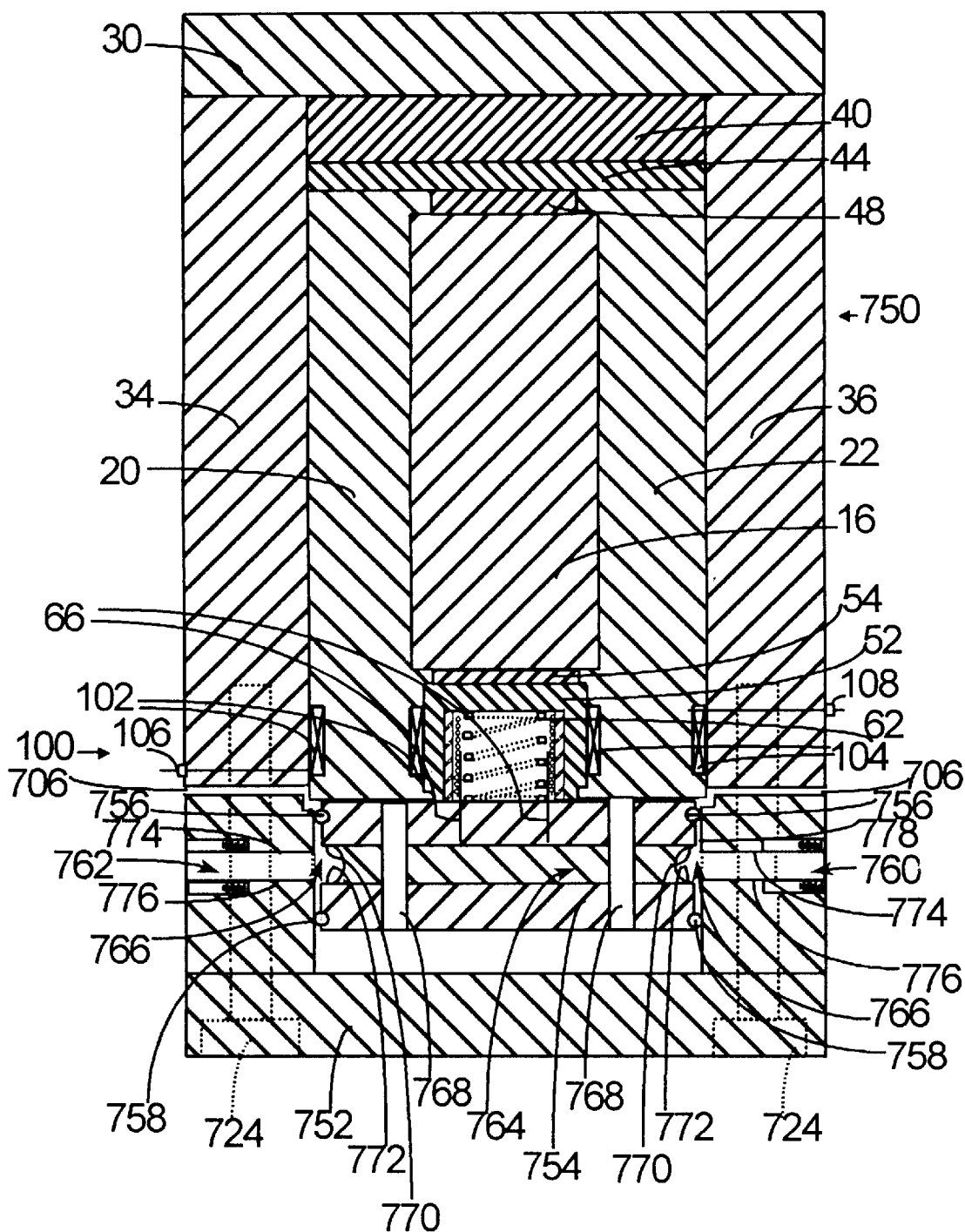
FIG. 18A is a side elevational view in cross-section of a magnetically-powered ON-OFF valve usable in high-pressure applications and constructed in accordance with the principles of the present invention.

Magnetically-powered valve 750 will preferably have a set of O-rings around the outer periphery of movable piston 754. For example, an upper O-ring 756 and a lower O-ring 758 can be provided as shown in FIG. 18A. It is preferred that neither of the O-rings 756 or 758 move into engagement with either the inlet 760 or the outlet 762 as piston 754 moves throughout its travel. It is additionally preferred that small through-holes, designated by the index numeral 768, between the chambers above and below movable piston 754 be located within movable piston 754, as shown in FIG. 18A.

Movable piston 754 preferably has two different diameters, in which its mid-portion forms a spool portion 764 having a reduced diameter with respect to the remaining portions of piston 754. Spool portion 764 is formed by a groove that is machined in the circumferential diameter of piston 754, and this groove provides a fluid chamber 766 that exists around the outer surfaces of the grooved spool portion 764, between the top boundary 770 of the groove and the bottom boundary 772 of the groove. For valve 750 to be "opened", the grooved spool portion 764 must line up with the inlet and outlet 760 and 762, so that the grooved top boundary 770 is substantially in line with the top boundary 774 of the ports, and the groove bottom boundary 772 is substantially in line with the bottom boundary 776 of the ports. When this alignment takes place, it can be easily seen from FIG. 18A that fluid will pass between the inlet 760 and outlet 762.

In order to place valve 750 in its "closed" position, movable piston 754 must be moved downward (in FIG. 18A) so that the groove top boundary 770 is at a position lower than the port bottom boundary 776. When this occurs, it is important that the land top boundary located at index numeral 778 remain above (in FIG. 18A) the port top boundary 774, thereby insuring that upper O-ring 756 is not within the inlet 760 region.

These movements of piston 754 are readily controlled by electrical circuit 100 of magnetically-powered valve 750. When it is desired to open the valve, a pulse current is directed to terminals 106 and 108, thereby energizing coils 102 and 104 to reduce the resulted reluctance of the pole pieces 20 and 22 at the location of coils 102 and 104. When this occurs, movable piston 754 will be attracted to pole pieces 20 and 22, and will move upward (in FIG. 18A) until stopped by the bottom surfaces of pole pieces 20 and 22. When this occurs, the grooved spool portion 764 will be substantially aligned with inlet 760 and outlet 762. Piston 754 will remain in that position even though there is no current flow in electric circuit 100.

To close magnetically-powered valve 750, a current pulse of the opposite polarity is directed into electrical circuit 100 at terminals 106 and 108, so that electromagnetic coils 102 and 104 are energized in the opposite direction, thereby increasing the resultant reluctance of pole pieces 20 and 22 at the location of coils 102 and 104. When that occurs, movable piston 754 will no longer be attracted to pole pieces 20 and 22, and compression spring 62 will push piston 754 away from pole pieces 20 and 22 until piston 754 reaches its maximum travel position. When that occurs, the spool portion 764 will no longer be in alignment with inlet 760 and outlet 762, thereby closing the fluid path around fluid chamber 766.

Figure 18B:
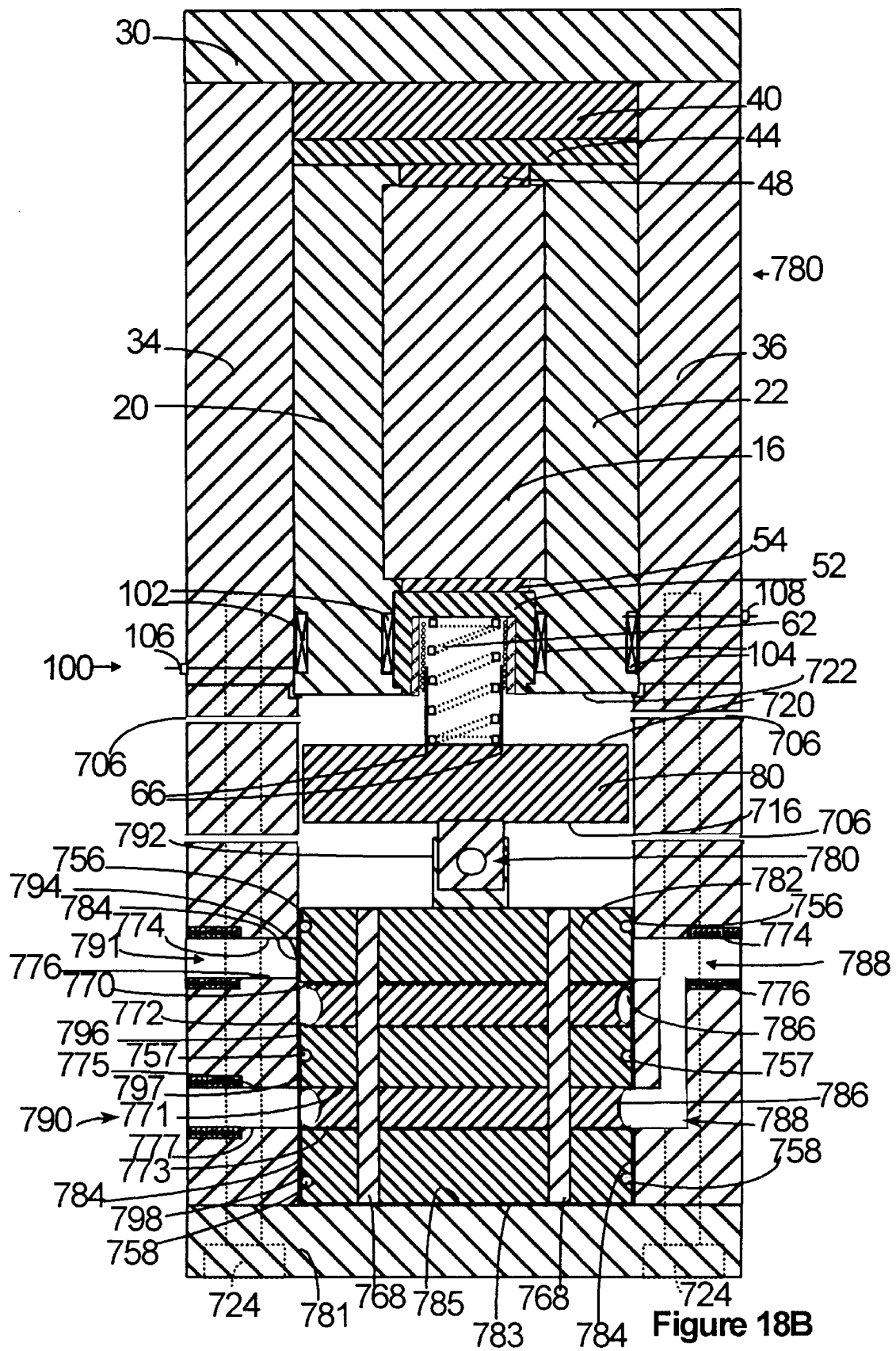
FIG. 18B is a side elevational view in cross-section of a magnetically-powered 2-way valve usable in high-pressure applications and constructed in accordance with the principles of the present invention.

It will be understood that many various configurations of fluid ports, spool shapes, inlet and outlet shapes and configurations can be constructed by use of certain structural features from both magnetically-powered valves 700 and 750 without departing from the principles of the present invention. One obvious modification would be to add a valve spool support connector 780 to the bottom of movable piston 80, and then attach a connector 792 to the top surface of a spool 782, which could have multiple different lands 784 and grooves 786 (and would be attached to support connector 780). Spool 782 could have, for example, many different inlets 788 and outlets 790 and 791, thereby providing for operation of a two-way, three-way, or other type of multiple inlet and outlet valve. A schematic cross-section of such a valve is depicted in FIG. 18B.

The primary magnetic components of valve 780 are very similar to the upper components of the linear displacement device 10 depicted in FIG. 1, essentially those components included in the half-assembly 12. Using the same components, a lower valve body 781 can be permanently affixed to the housing side pieces 34 and 36 (as seen in FIG. 18B), so that the movable spool 782 is now surrounded by fluid passages comprising inlets 788 and outlets 790 and 791. An O-ring 756 is preferably located around the upper, outer periphery of spool 782 to prevent any of the operating fluid within the fluid passages from escaping towards piston 80.

It is preferred that vents to atmosphere, designated by the index numeral 706, be included in the valve body 781 to prevent any gaseous substance from being trapped or accumulated in the regions near piston 80. To create a movement in movable piston 80, an electrical current pulse is directed into the electrical circuit 100 at terminals 106 and 108 to energize electromagnetic coils 102 and 104. As described in detail hereinabove, the current pulse (of a positive polarity at terminal 106) causes the resultant reluctance to be increased in pole pieces 20 and 22 near coils 102 and 104, and piston 80 will not be attracted to pole pieces 20 and 22. Compression spring 62 will push piston 80 away from these pole pieces until it stops at its most extended travel position. When this occurs, the bottom surface 716 of piston 80 will move to its end travel position such that the bottom surface 783 of spool 782 will nearly abut against the inner top surface 785 of valve body 781, thereby closing off any potential fluid path between inlet 788 and outlet 791, while opening a fluid path between inlet 788 and outlet 790 (as depicted in FIG. 18B). When this occurs, magnetically-powered valve 700 will essentially be in its "first" or "ON1" position.

Once magnetically-powered valve 780 is in its ON1 position, it will stay in that position even though no current is flowing through electrical circuit 100. In order to move piston 80 to its opposite travel position, a current pulse of opposite polarity is introduced into electrical circuit 100 at terminals 106 and 108. This opposite polarity current pulse travels through coils 102 and 104 so as to decrease the resultant reluctance of pole pieces 20 and 22 at the locations of coils 102 and 104, thereby creating a magnetic attraction between pole pieces 20 and 22 and movable piston 80. When that occurs, piston 80 moves upward (in FIG. 17) until its top surface 720 abuts or nearly abuts the bottom surface 722 of pole pieces 20 and 22. When this occurs, the fluid path between inlet 788 and outlet 791 is opened and the fluid path between inlet 788 and outlet 790 is closed. Magnetically-powered valve 780 is then in its "second" or "ON2" position. It will be understood that the fluid flowing through the fluid passages of inlet 788 and outlets 790 and 791 can be any type of gaseous or liquid substance, such as hydraulic oil, water, pressurized air, and the like.

Magnetically-powered valve 780 will preferably have a other O-rings 757 and 758 around the outer periphery of movable spool 782, as shown in FIG. 18B. It is preferred that none of the O-rings 756, 757, or 758 move into engagement with either the inlets 788 or the outlet 790 and 791 as spool 782 moves throughout its travel.

Movable spool 782 preferably has two different diameters, in which its mid-portion forms grooves that are reduced in diameter with respect to other of its portions. The grooves are machined in the circumferential diameter of spool 782, which provide fluid passageways that exists around the outer surfaces of spool 782, between the top boundary 770 of the upper groove and the bottom boundary 772 of the upper groove, and between the top boundary 771 of the lower groove and the bottom boundary 773 of the lower groove. For valve 780 to be in its ON1 condition, spool 782 must have its lower groove line up with the inlet 788 and outlet 790, so that the groove top boundary 771 is substantially in line with the top boundary 775 of the outlet port, and the groove bottom boundary 773 is substantially in line with the bottom boundary 777 of that port. When this alignment takes place, it can be easily seen from FIG. 18B that fluid will pass between the inlet 788 and outlet 790. When this occurs, it is important that upper land's top boundary located at index numeral 794 remain above (in FIG. 18B) the port top boundary 774, thereby insuring that upper O-ring 756 is not within the inlet 788 or outlet 791 regions. It is also important that the middle land's bottom boundary located at index numeral 797 remain above (in FIG. 18B) the port top boundary 775, thereby insuring that middle O-ring 757 is not within the inlet 788 or outlet 790 regions.

In order to place valve 780 in its ON2 condition, movable spool 782 must be moved upward (in FIG. 18B) so that its upper groove lines up with inlet 788 and outlet 791, so that the groove top boundary 770 is substantially in line with the top boundary 774 of the outlet port, and the groove bottom boundary 772 is substantially in line with the bottom boundary 776 of that port. When this alignment takes place, fluid will pass between the inlet 788 and outlet 791. When this occurs, it is important that lower land's bottom boundary located at index numeral 798 remain below (in FIG. 18B) the port bottom boundary 777, thereby insuring that lower O-ring 758 is not within the inlet 788 or outlet 790 regions. It is also important that the middle land's top boundary located at index numeral 796 remain above (in FIG. 18B) the port bottom boundary 776, thereby insuring that middle O-ring 757 is not within the inlet 788 or outlet 791 regions.

Figure 19:
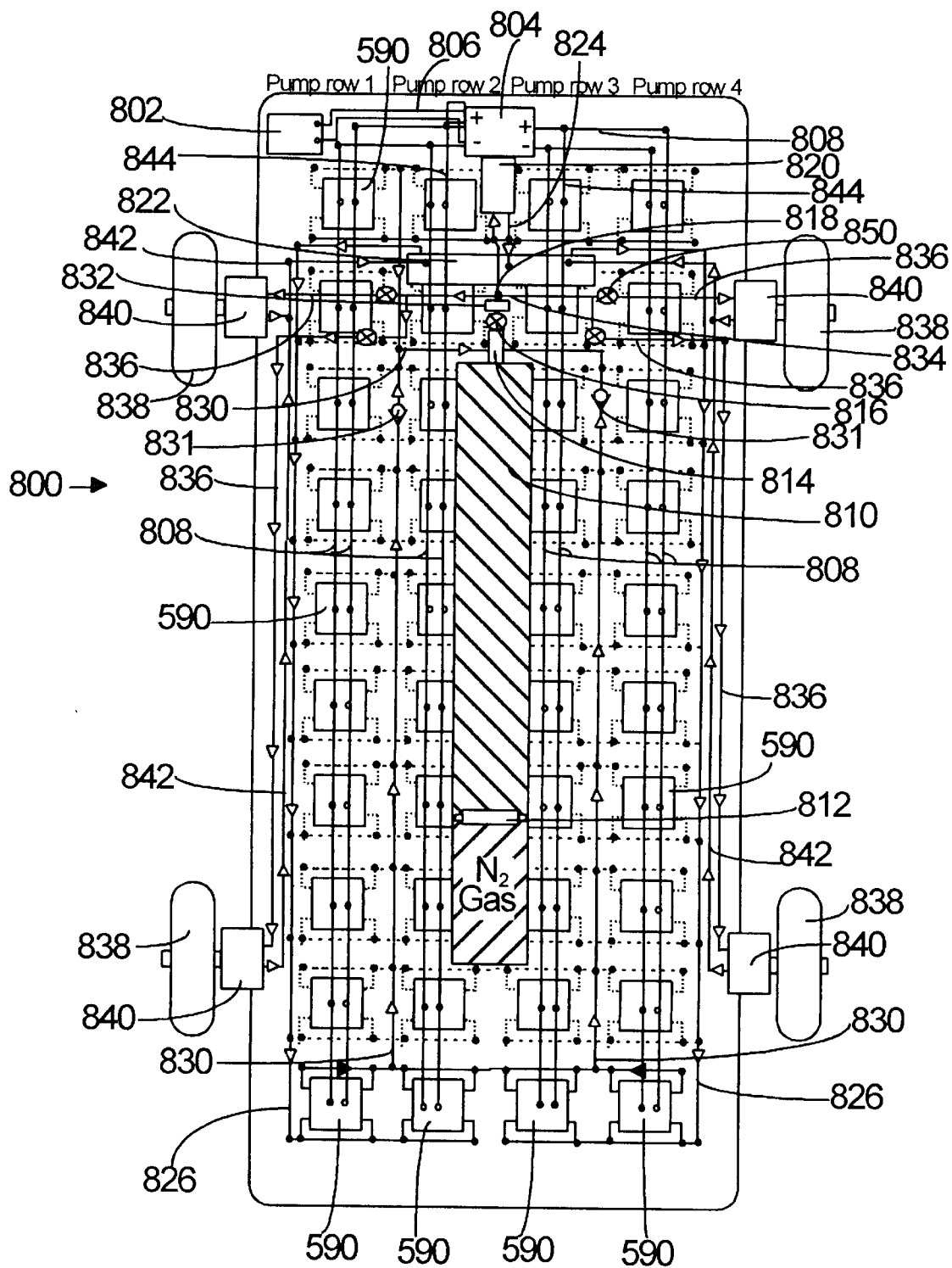
FIG. 19 is a top plan view of a magnetically-powered motor vehicle constructed in accordance with the principles of the present invention.

A magnetically-powered motor vehicle, generally designated by the index numeral 800, is depicted in FIG. 19 and which utilizes the magnetically-powered pumps 590 described hereinabove. It is preferred that a 12 volt DC battery, depicted by index numeral 802, be provided for use with accessory items in standard automobiles, and as a source of electrical energy to provide the initial current pulse that is required to initiate operation of the magnetically-powered pumps 590.

The output of battery 802 is directed along electrical lines 806 over to an electrical generator 804. Generator 804 includes charging electronics which will, once generator 804 is operating, recharge battery 802.

Generator 804 also includes electronics that generate the proper voltage and current pulses required for operation of the magnetically-powered pumps 590, and these electrical pulses are output along electrical lines 808, to each of the pumps 590 within magnetically-powered motor vehicle 800. Once the magnetically-powered pumps 590 begin operating, they will create a fluid pressure at their individual discharges, which are run along a hydraulic line 830 that leads to a hydraulic manifold 814. As pressure builds up at hydraulic manifold 814, pressure will also begin to increase within a hydraulic accumulator designated by the index numeral 810. Hydraulic accumulator 810 is preferably a high pressure accumulator that contains a one-time pre-charge of nitrogen gas and is preferably a piston-type accumulator having a piston 812 (schematically shown in FIG. 19). Once the pressure within accumulator 810 achieves a predetermined threshold, hydraulic fluid will start to flow through a pressure reducing valve 816 and further through a hydraulic circuit that includes a throttle braking hydraulic valve circuit, an overrun limiter circuit, and an oil filter. Once the hydraulic oil has flowed through the oil filter, it then is directed into a high-pressure hydraulic line 830 that takes the fluid to a low-power hydraulic motor 820. Hydraulic motor 820 drives the electrical generator 804, thereby providing the necessary electrical power for the entire motor vehicle 800.

The return line from hydraulic motor 820, line 824, is run to the input side (i.e., the upper portion) of a heat exchanger/reservoir 822. The output side (i.e., the lower portion) of heat exchanger/reservoir 822 is run to a hydraulic line 826 that is then connected to each of the magnetically-powered pumps 590 at their suction sides.

As related above, the discharge side of the magnetically-powered pumps 590 is run through hydraulic lines 830 and continues to manifold 814. In addition, however, once the system is pressurized, hydraulic fluid also will be allowed to flow through a set of solenoid-operated pressure control modulating valves 850, which will then allow the hydraulic fluid to flow to other hydraulic motors in motor vehicle 800. Before the hydraulic fluid from the discharge of pumps 590 reaches these pressure control modulating valves 850, it must pass through check valves 831, which prevent high pressure oil from the accumulator 810 or intake manifold 814 from returning to the discharge side of the magnetically-powered pumps 590.

The high-pressure lines between accumulator 810 and the pressure control modulating valves 850 is designated by the index numerals 834. Once pressure control modulating valves 850 are open, hydraulic fluid will pass through high-pressure lines 836 between pressure control modulating valves 850 and hydraulic motors 840 that are located at each of the wheels 838 of motor vehicle 800. If necessary, one or more of the pressure control modulating valves 850 can be turned off in the event that one or more of the hydraulic motors 840 at a wheel 838 is not operating properly, or the system is otherwise down for that portion of the hydraulic circuit. In this manner, only one hydraulic motor 840 need be operating during low-load operating conditions of motor vehicle 800, and the other hydraulic motors 840 can be brought on line as needed.

After the hydraulic fluid passes through hydraulic motors 840, it then returns through low-pressure hydraulic lines 842 back to the input side of heat exchanger 822.

Electrical pulses supplied to each of the magnetically-powered pumps 590 preferably produce a first polarity along the first pump row (listed as pump row 1 on FIG. 19), and a second, opposite polarity to the pumps 590 along pump row 2. This configuration is recommended because each pair of adjacent pumps in rows 1 and 2 are preferably mounted on a single platform, with end armature movements in opposing directions at any given time interval, thereby reducing the vibration in motor vehicle 800. This can be accomplished by either reversing the polarity of the electric lines 808 for pump row 2 as compared to pump row 1, or by utilizing a phase shift circuit 844 for the electrical lines in pump row 2 (and also for the electrical lines in pump row 3 which also has its magnetically-powered pumps 590 mounted in adjacent pairs with those pumps of pump row 4). Assuming each magnetically-powered pump 590 displaces 0.6 inches at a frequency of 50 Hertz, and having a power output of 325 lbs. of force, each of magnetically-powered pumps 590 will produce approximately three horsepower (3 HP) of hydraulic power. Pumps 590 can also produce a high pressure of 3,000 PSI or more, and using standard 30 horsepower hydraulic motors at approximately 2,800 PSI of pressure, an output motor speed of approximately 1,088 rpm can be achieved, which would thereby provide a vehicle speed of about 94 miles per hour for a standard weight automobile.

To initiate operation of magnetically-powered motor vehicle 800, battery 802 need only provide electrical power for a portion of pumps 590, e.g., eleven of the pumps (or one row), which would require about 1760 watts of power from battery 802. This power drain of battery 802 would exist for approximately 60 seconds while these eleven pumps 590 charge accumulator 810 to a sufficient pressure to operate generator 804. Using a standard 8 kilowatt (kW) generator for generator 804, approximately 1,000 PSI of hydraulic pressure is required for the 11 horsepower hydraulic motor 820 to sufficiently drive generator 804. Once generator 804 is operating, battery 802 need not supply any more power for driving pumps 590.

It will be understood that various configurations of magnetically-powered pumps 590 can be used other than that depicted in FIG. 19 without departing from the principles of the present invention. It will additionally be understood that the precise hydraulic circuitry in FIG. 19 is presented for purposes of an exemplary example and other hydraulic schemes can be utilized without departing from the principles of the present invention. It will additionally be understood that hydraulic motors 840 could be replaced by D.C. motors, which could then be directly driven by a larger generator 804, thereby eliminating many of the hydraulic lines within motor vehicle 800, whereby the pumps 590 would merely charge hydraulic accumulator 810 so that it can sufficiently drive the necessarily larger hydraulic motor 820 so it can, in turn, drive the larger generator 804.

It is preferred that some type of dynamic braking be included in motor vehicle 804, whether that dynamic braking be hydraulic as produced by element 832 of FIG. 19, or whether that braking be produced electrically when used with direct current motors at each of the wheels instead of hydraulic motors. In FIG. 19, element 832 contains a throttle braking hydraulic valve circuit which provides dynamic vehicle braking for each hydraulic motor 840 that is mounted on one of the wheels 838. In addition, an overrun hydraulic limiter circuit is included in element 832 to prevent a vehicle "runaway" as motor vehicle 800 moves downhill. It will be understood that these features of element 832 are standard off-the-shelf components that are available for hydraulic systems, and that similar electrical components could be used in an electrical circuit as an alternative.

Another use of the magnetically-powered pumps 590 in the hydraulic and electrical circuits of motor vehicle 800 is to simply generate electric power in a stationery platform. Rather than driving hydraulic motors 840 with hydraulic fluid, all the hydraulic fluid of the system could be utilized to drive a much larger hydraulic motor 820, which in turn, can drive a much larger generator or alternator 804. This larger electrical generator/alternator could be used to provide house current, or could be used in series with several other units to generate electrical power in a standard 60 Hertz three-phase electrical power system.

A further example of an electrical generator based upon the principles of the present invention is a linear alternator, such as that disclosed in FIG. 6 which depicts a linear displacement device 130 with magnetos 150 and 170. These magnetos are normally used to create electrical current pulses to operate the upper and lower electrical circuits 100 and 110, however, if more powerful magnetos were provided, much greater electrical power could be generated. It would be well within the level of skill in the art to provide magnetos 150 and 170 with larger and longer permanent magnets 152 and 172, and with field coils 156 and 176 that utilize many more windings, thereby increasing the overall voltage and current generated by each magneto 150 and 170.

An alternative construction of a linear alternator would be to use the magneto configuration depicted in FIG. 16 (for the magnetically-powered pump). If the hydraulic pumping elements were removed from FIG. 16, a magnetically-powered linear displacement capability would remain having two permanent magnets 252 and 253, two movable end-armatures 258 and 260, and several end-mounted magnetos, such as those designated by the index numerals 672, 673, 674, and 675. The end-mounting of the magnetos gives rise to readily constructing physically larger and more powerful magnetos (having more windings in their field coils, and having permanent magnets 677 and 681 that are greater in length), as well as adding many more banks of such magnetos, electrically connected in either series or parallel, or some combination thereof, and thereby providing an easily-accessible output. By providing one or more banks of such linear alternators, one could construct an alternating-current electrical power source of either single phase or of multi-phase electrical output using techniques available in the current art.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A linear, reciprocating displacement pump, comprising:

(a) a permanent magnet having a first end and a second end, said magnet producing a magnetic field;

(b) at least one pole piece made of a magnetic material that exhibits no substantial magnetic retentivity and exhibits a flux density capability to become substantially magnetized due to said magnetic field, said at least one pole piece being located adjacent to the magnet;

(c) a first armature located at said first end of said magnet and a second armature located at said second end of said magnet, both said first and second armatures being made of a magnetic material that exhibits no substantial magnetic retentivity and exhibits a sufficient flux density capability to become substantially magnetized due to said magnetic field, at least one of said first and second armatures being reciprocally movable with respect to said magnet;

(d) a coil made of an electrical conductor, said coil being individually wound around said at least one pole piece proximal to said first end of the magnet, said coil, when conducting electrical current in a first direction, decreasing the resultant reluctance of said at least one pole piece proximal to said first end of the magnet, said coil, when conducting electrical current in a second direction opposite said first direction, increasing the resultant reluctance of said at least one pole piece proximal to said second end of the magnet; and (e) an oscillating pump sub-assembly, comprising at least one fluid chamber having an outer sleeve that substantially surrounds a movable reciprocating piston, a suction port, and a discharge port, said movable piston being operationally attached to the reciprocally movable of said first and second armatures, said movable piston being configured to compress a fluid contained within said fluid chamber during a portion of its reciprocating movement.

2. The linear, reciprocating displacement pump as recited in claim 1, further comprising a seal set within said at least one fluid chamber to retain the fluid therein.

3. The linear, reciprocating displacement pump as recited in claim 1, further comprising a check valve located within each of said suction and discharge ports.

4. The linear, reciprocating displacement pump as recited in claim 1, further comprising a heat sink.

5. The linear, reciprocating displacement pump as recited in claim 1, further comprising at least one magneto positioned proximal to the reciprocally movable of said first and second armatures.

6. The linear, reciprocating displacement pump as recited in claim 1, further comprising an elastic energy storage device that provides a force that causes the reciprocally movable of said first and second armatures to be displaced.

7. The linear, reciprocating displacement pump as recited in claim 6, wherein said elastic energy storage device comprises at least one compression spring being operationally attached to the reciprocally movable of said first and second armatures.

* * * * *